(12) United States Patent
Nakamura et al.

(10) Patent No.: US 6,847,441 B2
(45) Date of Patent: Jan. 25, 2005

(54) METHOD OF MEASURING OPTICAL CHARACTERISTICS OF SPECTACLE LENSES AND LENS METER

(75) Inventors: Shinichi Nakamura, Tokyo (JP); Eiichi Yanagi, Tokyo (JP)

(73) Assignee: Kabushiki Kaisha Topcon, Tokyo (JP)

(*) Notice: Subject to any disclaimer, the term of this patent is extended or adjusted under 35 U.S.C. 154(b) by 16 days.

(21) Appl. No.: 10/617,260

(22) Filed: Jul. 11, 2003

(65) Prior Publication Data

US 2004/0061847 A1 Apr. 1, 2004

(30) Foreign Application Priority Data

Jul. 11, 2002 (JP) .................................. 2002-202839

(51) Int. Cl.[7] .............................................. G01B 9/00
(52) U.S. Cl. ................................................... 356/124
(58) Field of Search ................................ 356/124–125, 356/127; 33/200

(56) References Cited

U.S. PATENT DOCUMENTS

| 4,098,002 A | * | 7/1978 | Campbell et al. | ............. 33/200 |
| 4,212,538 A | * | 7/1980 | Esmond | ...................... 356/127 |
| 4,676,004 A | * | 6/1987 | Nakamura et al. | ............. 33/200 |
| 5,152,067 A | * | 10/1992 | Kurachi et al. | ............... 33/200 |
| 6,154,969 A | * | 12/2000 | Abitbol et al. | ................ 33/200 |
| 2002/0085196 A1 | * | 7/2002 | Fukuma et al. | ............. 356/124 |

* cited by examiner

Primary Examiner—Zandra Smith
Assistant Examiner—Kara Geisel
(74) Attorney, Agent, or Firm—Armstrong, Kratz, Quintos, Hanson & Brooks, LLP

(57) ABSTRACT

Disclosed are a spectacle lens optical characteristics measuring method and a lens meter in which measurement beams are not intercepted by lens pressers. The left and right lenses of a pair of spectacles are point-supported by lens rest shafts at some midpoints in the optical paths of a pair of left and right measurement optical systems, and the spectacle frame for the lenses is held by a pair of frame retaining plates from the front and rear sides. In this state, the spectacle lenses are pressed against lens rest shafts by lens presser shafts to be thereby supported, whereby the way the spectacle frame is held by the frame retaining plates is corrected. After the correction, the lens presser shafts are retracted from the measurement optical paths of the measurement optical systems, and measurement beams around the lens rest shafts transmitted through the spectacle lenses are received by a CCD of the measurement optical systems, the optical characteristics of the spectacle lenses being obtained by a computation control circuit on the basis of measurement signals from the CCD.

5 Claims, 18 Drawing Sheets

METHOD OF MEASURING OPTICAL CHARACTERISTICS OF SPECTACLE LENSES AND LENS METER

BACKGROUND OF THE INVENTION

1. Field of the Invention

This invention relates to a method of measuring optical characteristics of spectacle lenses and a lens meter in which it is possible to measure refraction characteristics of right and left lenses of a pair of spectacles individually by means of two measurement optical systems.

2. Description of the Related Art

A conventionally known lens meter includes: upper and lower accommodating protrusions provided on upper and lower portions of a front surface of a main body case and vertically spaced apart from each other; a lens rest provided on an upper surface of the lower accommodating protrusion; a lens table extending horizontally and mounted to the main body case so as to be movable forwards and backwards with respect to the lens rest; a nose pad support member mounted to the lens table so as to be horizontally and vertically movable; and a measurement optical system for measuring refraction characteristics of a lens placed on the lens rest. In this lens meter, the measurement optical system is equipped with an illumination optical system provided in the main body case and the upper accommodating protrusion and a light receiving optical system provided in the lower accommodating protrusion and the main body case.

Further, in this lens meter, the nose pads of a pair of spectacles are supported by the nose pad support member, and right and left lens rims of a spectacle frame are held in contact with a front surface of the lens table. In this state, the nose pad support member is moved horizontally and vertically, and the lens table is moved forwards and backwards to bring one of the right and left lenses into contact with the lens rest, measuring the refraction characteristics of that lens by the measurement optical system. To perform measurement on the other lens, the spectacle frame is moved in the same way as described above so as to bring the other lens into contact with the lens rest.

The above-described conventional lens meter has a problem in that, when performing measurement on the right and left spectacle lenses, it is necessary to bring the lenses one by one into contact with a single lens rest, which is a bother.

This problem might be solved by a lens meter equipped with a pair of optical systems for performing measurement on the right and left lenses of a pair of spectacles. In such a lens meter, to accurately measure the refraction characteristics of the spectacle lenses, it is necessary, in the measurement optical axis of each light receiving optical system, for the distance between the lower surface of the lens and the light receiving means of the light receiving optical system to be fixed. For this purpose, there has been proposed a construction in which a shaft-shaped lens rest is provided at some midpoint of the optical path of each of the right and left measurement optical systems to make the distance between the lower surface of the lens and the light receiving means of the light receiving optical system fixed.

Further, as an example of such a lens meter, there has also been proposed a construction in which optical characteristics of a spectacle lens at a multitude of points thereof are simultaneously measured by utilizing a measurement beam passing a periphery of a shaft-shaped (pin-shaped) lens rest, indicating refractive powers, etc. at the multitude of points as obtained from the measurement result through mapping display. In this case, in order to prevent displacement of the spectacle lens supported by the lens rest at the time of measurement, the spectacle lens is pressed against the lens rest by means of a lens presser.

However, since the spectacle lens is thus secured in position by means of this lens presser, it is impossible to project measurement beam to that portion of the spectacle lens where the lens presser exists, which that portion cannot be measured accurately.

SUMMARY OF THE INVENTION

It is accordingly an object of this invention to provide a method of measuring the optical characteristics of spectacle lenses and a lens meter which are free from an obstruction to the measurement beam due to such a lens presser.

In order to attain the above-mentioned object, according to a first aspect of the present invention, there is provided a spectacle lens optical characteristic measuring method, including: point-supporting left and right spectacle lenses of a pair of spectacles respectively by lens rests at some midpoints of optical paths of a pair of left and right measurement optical systems; retaining a spectacle frame for the spectacle lenses from front and rear sides by a pair of frame retaining members; pressing the spectacle lenses in this state against the lens rests by a lens presser member to correct the way the spectacle frame is retained by the frame retaining members; retracting the lens presser members from the optical paths of the measurement optical systems; measuring measurement beams around the lens rests transmitted through the spectacle lenses by the measurement optical systems; and obtaining optical characteristics of the spectacle lenses on the basis of a measurement signal from the measurement optical systems by a computation control circuit.

Further, in order to attain the above-mentioned object, according to a second aspect of the present invention, there is provided a lens meter, including: a pair of left and right lens rests capable of point-supporting left and right lenses of a pair of spectacles; a pair of frame retaining members capable of holding a spectacle frame of the pair of spectacles whose lenses are supported by the lens rests from front and rear sides; lens presser members for pressing the spectacle lenses supported by the lens rests against the lens rests; a pair of left and right measurement optical systems for measuring optical characteristics of the spectacle lenses supported by the lens rests on the basis of measurement beams passing a periphery of the lens rests; and a computation control circuit which controls the measurement optical systems to cause it to execute the measurement and which obtains the optical characteristics of the spectacle lenses on the basis of measurement signals from the measurement optical systems, the lens meter further including presser member driving means for moving the lens presser members from pressing positions where they press the spectacle lenses against the lens rests and to retracted positions where they are retracted from the pressing positions, in which the computation control circuit controls the measurement optical systems upon movement of the lens presser members to the retracted positions by the presser member driving means so as to cause them to execute measurement of the optical characteristics of the spectacle lenses.

Further, according to a third aspect of the present invention, in the second aspect of the lens meter of the invention, the pair of frame retaining members have opposing surfaces tapered so as to be inclined respectively downwardly.

Further, according to a fourth aspect of the present invention, in the second or third aspect of the invention, the lens meter further includes frame detecting means provided between the pair of frame retaining members and adapted to detect the spectacle frame of the spectacle lenses supported by the lens rests and retaining member driving means for driving the pair of frame retaining members so as to move them toward and away from each other, and in the lens meter, the computation control circuit operationally controls the retaining member driving means upon detection of the spectacle frame by the frame detecting means so as to move the pair of frame retaining members toward each other to cause them to hold the spectacle frame, and operationally controls the presser member driving means so as to move the lens presser members to the pressing positions to press the spectacle lenses against the lens rests before moving the lens presser members to the retracted positions.

Further, according to a fifth aspect of the present invention, in any one of the second to fourth aspects of the lens meter of the invention, the frame detecting means is further equipped with a nose pad support member for supporting nose pads of the pair of spectacles which is arranged between the pair of left and right measurement optical systems and movable in the back and forth direction, biasing means for forwardly biasing the nose pad support member, and a detecting switch which detects backward movement of the nose pad support member against the biasing force of the biasing means.

DESCRIPTION OF THE PREFERRED EMBODIMENTS

An embodiment of this invention will now be described with reference to the drawings.

[Construction]

(Apparatus Main Body)

Figure 1:
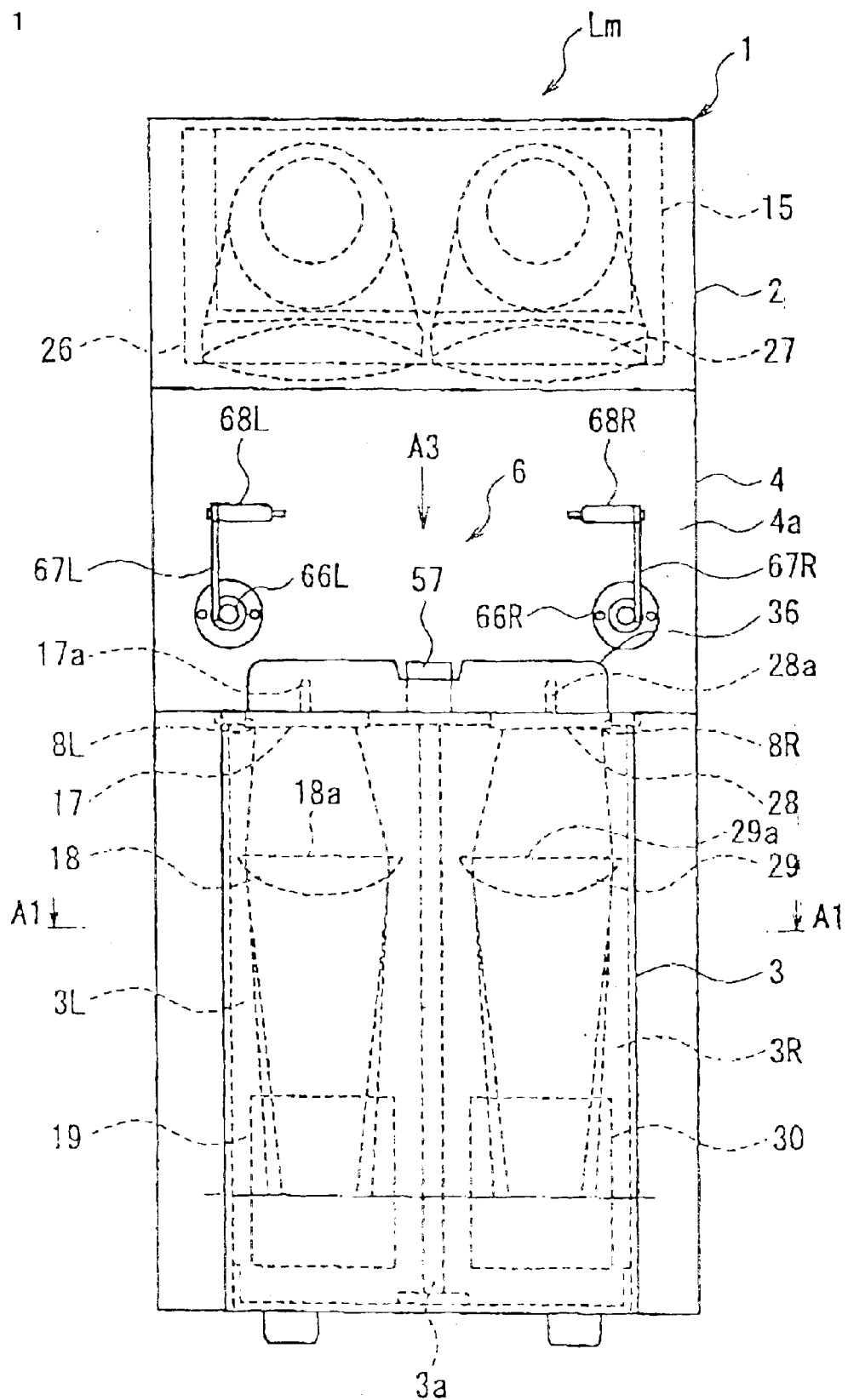
FIG. 1 is a front view of a lens meter according to the present invention.
Figure 2:
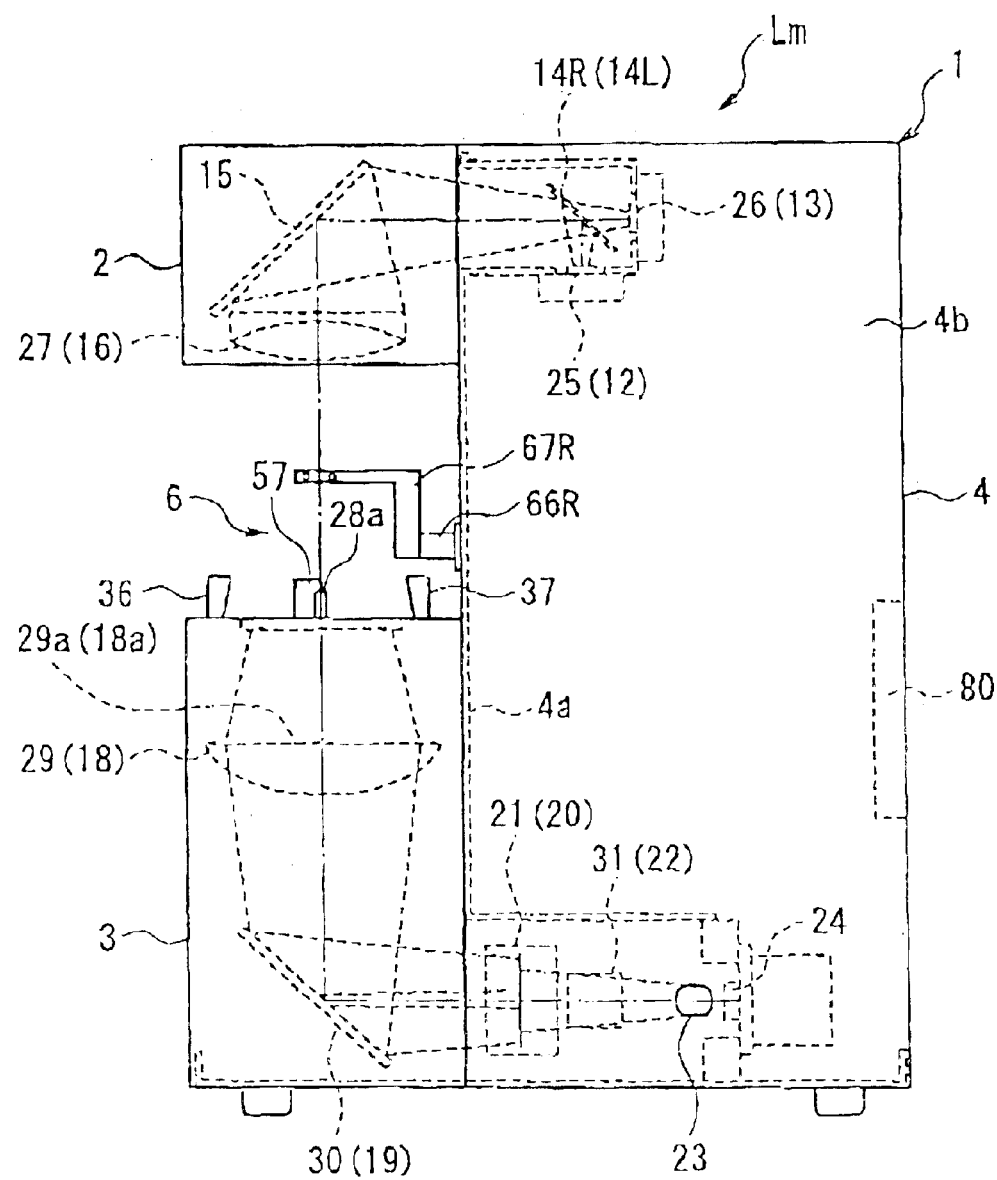
FIG. 2 is a right-hand side view of the lens meter of FIG. 1.
Figure 3:
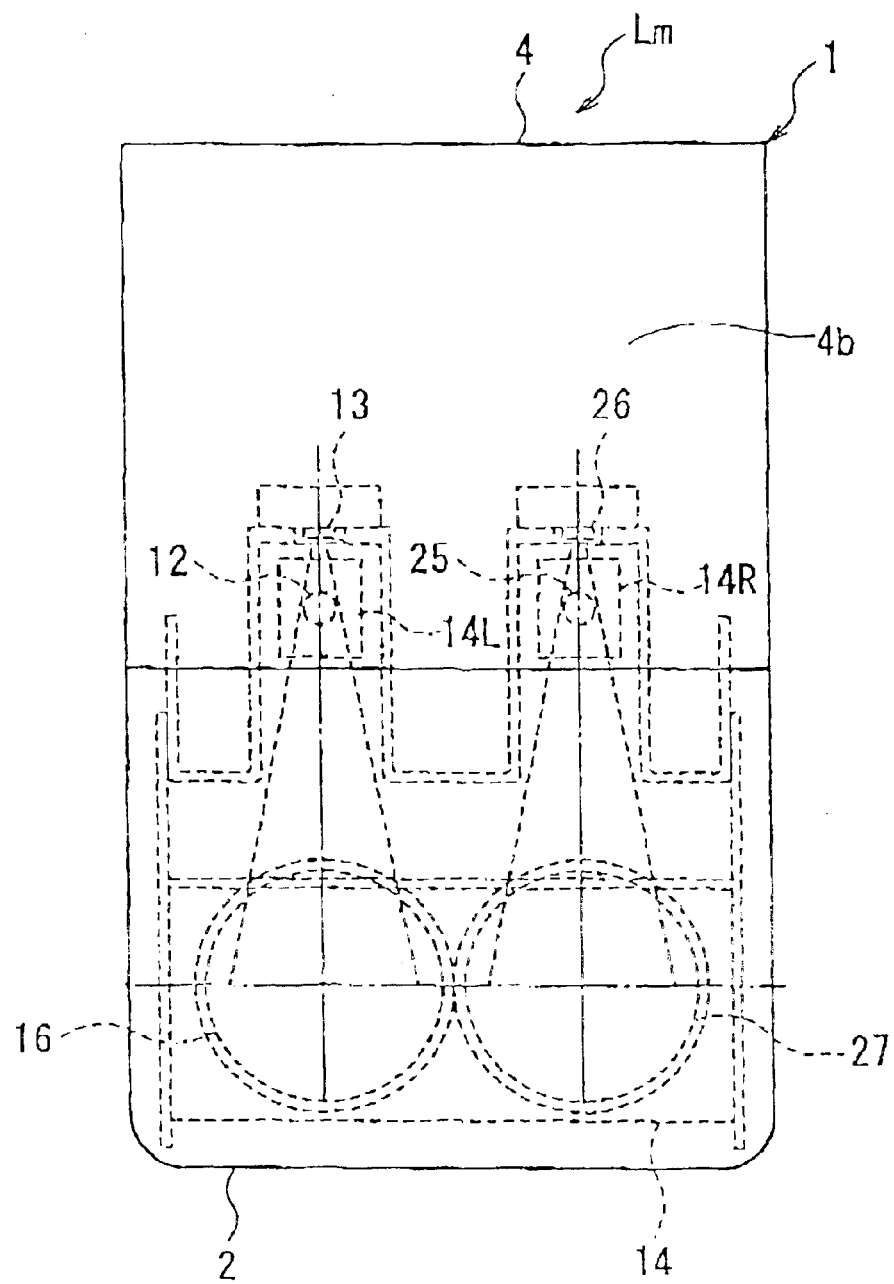
FIG. 3 is a plan view of the lens meter of FIG. 1.
Figure 4:
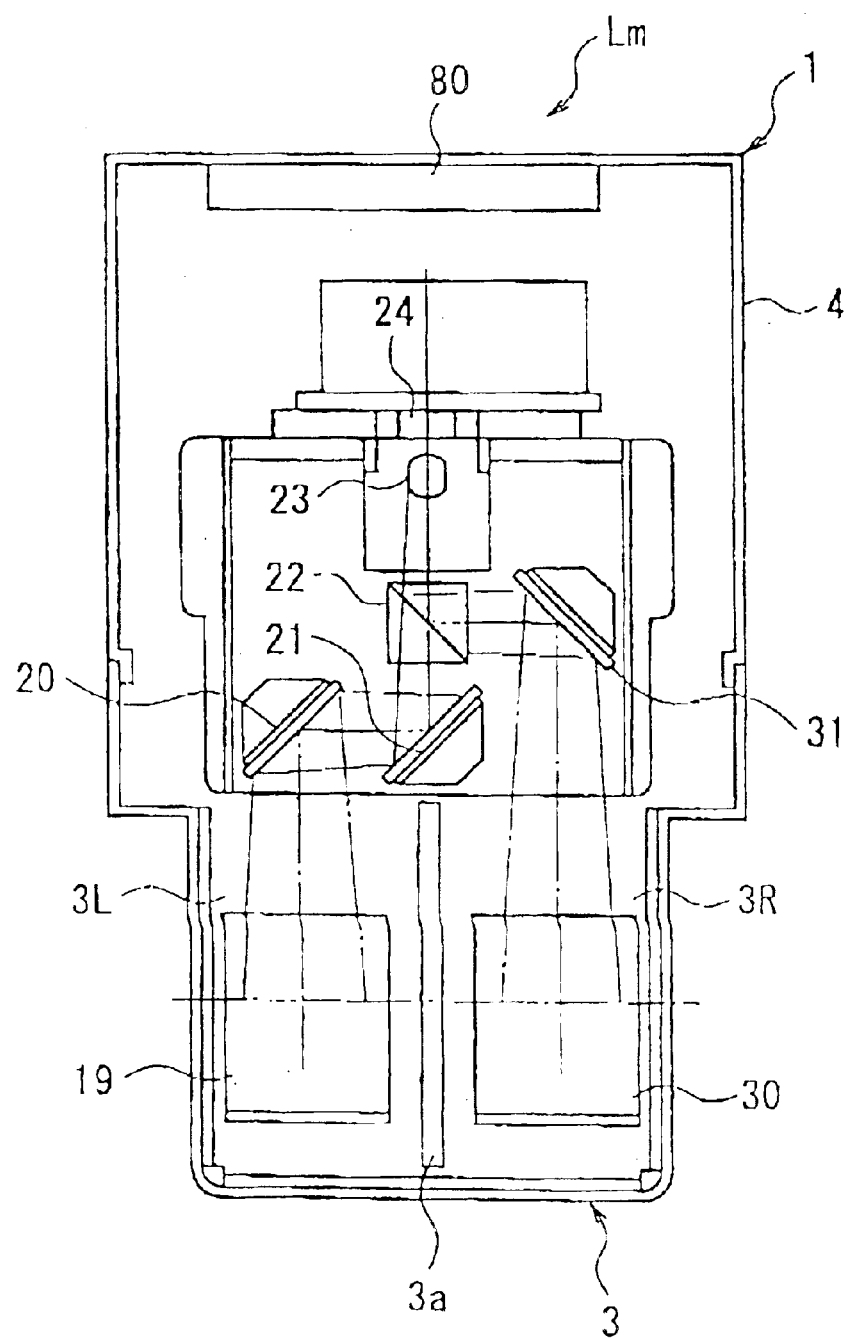
FIG. 4 is a sectional view taken along the line A1—A1 of FIG. 1.

FIG. 1 is a front view of a lens meter according to the present invention, and FIG. 2 is a right-hand side view of FIG. 1.

In FIGS. 1 and 2, reference numeral 1 indicates an apparatus main body (main body case). The apparatus main body 1 is composed of an upper casing 2, a lower casing 3, and a joint casing 4 joining the upper casing 2 and the lower casing 3 to each other, and has a substantially U-shaped configuration in side view as shown in FIG. 2. A space defined between the upper casing 2 and the lower casing 3 constitutes a setting space 6 for a pair of spectacles 5 shown in FIG. 5. The joint casing 4 is composed of a front wall 4a and a rear, detachable casing portion 4b.

In this embodiment, the pair of spectacles 5 have a spectacle frame MF, spectacle lenses LL and LR fitted in the left and right lens rims LF and RF of the spectacle frame MF, a bridge B connecting the left and right lens rims LF and RF, nose pads NP provided, for example, on the left and right lens rims LF and RF, and temples LT and RT provided on the left and right lens rims LF and RF.

Figure 5:
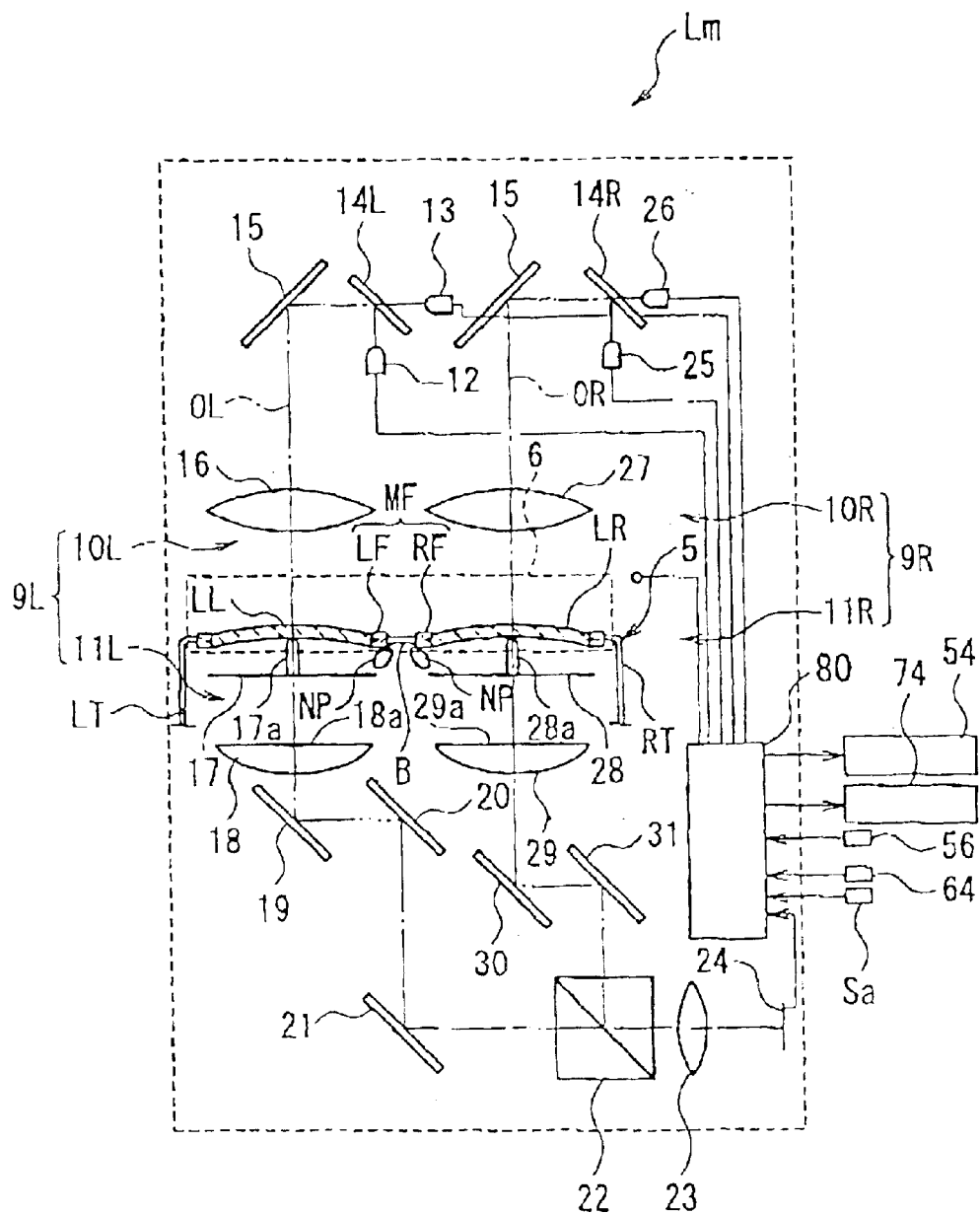
FIG. 5 is an explanatory view of an optical system and a control circuit in the lens meter shown in FIGS. 1 through 4.
Figure 9:
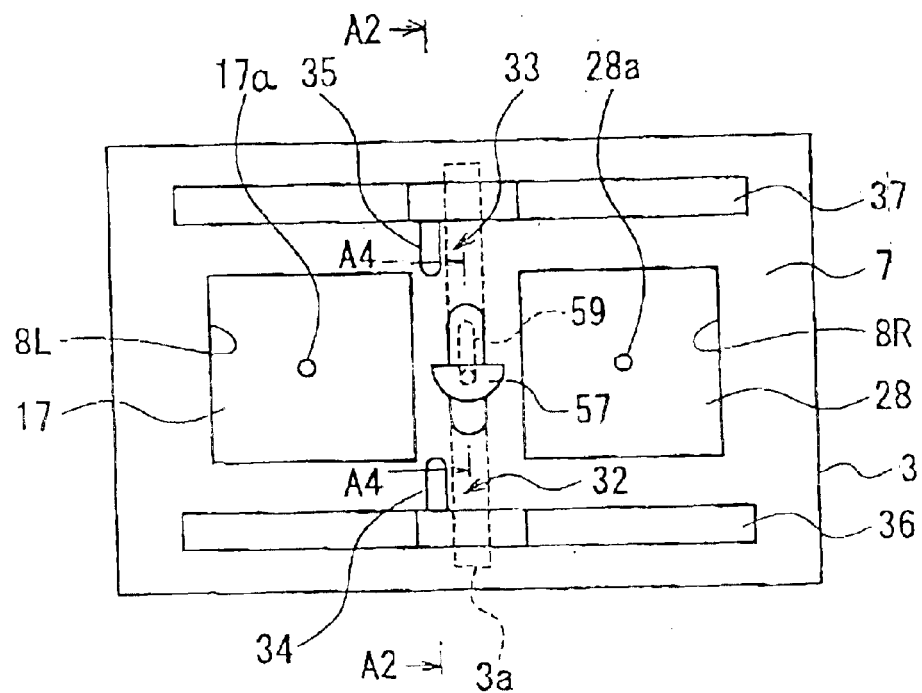
FIG. 9 is a plan view, as seen from a direction of an arrow A3, of the lens meter of FIG. 1.

Further, as shown in FIG. 9, the lower casing 3 has an upper wall 7 having openings 8L and 8R at left and right portions of the upper wall 7, as shown in FIG. 1. This lower casing 3 is divided into left and right spaces (chambers) 3L and 3R by a partition 3a arranged at its horizontal center. Further, the apparatus main body 1 has a pair of left and right measurement optical systems 9L and 9R as shown in FIG. 5.

<Measurement Optical Systems 9L and 9R>

(Left Measurement Optical System 9L)

The measurement optical system 9L has a light emitting optical system (illumination optical system) 10L contained in the upper casing 2 and a light receiving optical system 11L contained in the lower casing 3.

The light emitting optical system 10L is equipped with LEDs 12 and 13 serving as the light source for measurement beam projection, a dichroic mirror 14L, a reflection mirror 15, and a collimating lens 16. The LED 12 emits infrared light, and the LED 13 emits red light (with a wavelength of 630 nm). The dichroic mirror 14L reflects the infrared light from the LED 12, transmitting only the red light from the LED 13. The collimating lens 16 serves to convert divergent light emitted from the LEDs 12 and 13 into parallel beams as the measurement beams. Of the reflection mirror 15, the left half thereof is used.

The light receiving optical system 11L has a Hartmann pattern plate 17, a field lens 18 having a screen 18a on its upper surface, reflection mirrors 19, 20, and 21, an optical path synthesizing prism 22, an image formation lens 23, and a CCD (photo receptor, light receiving means) 24. The pattern plate 17 is equipped with a multitude of light transmission portions (not shown) arranged in matrix.

At the center of this-pattern plate 17, a pin-like lens rest shaft (lens rest) 17a protrudes upwards as a reference pin. This lens rest shaft 17a has a semi-spherical upper end portion, and is arranged such that its axis is in alignment with the optical axis of the measurement optical system 9L.

(Right Measurement Optical System 9R)

The measurement optical system 9R has a light emitting optical system (illumination optical system) 10R contained in the upper casing 2 and a light receiving optical system 11R contained in the lower casing 3.

The light emitting optical system 10R is equipped with LEDs 25 and 26 serving as the light source for measurement beam projection, a dichroic mirror 14R, a reflection mirror 15, and a collimating lens 27. The LED 25 emits infrared light, and the LED 26 emits red light (with a wavelength of 630 nm). The above-mentioned dichroic mirror 14R reflects the infrared light from the LED 25, transmitting only the red light from the LED 26. The collimating lens 27 serves to convert divergent light emitted from the LEDs 25 and 26 into parallel beams as the measurement beams. Of the reflection mirror 15, the right half thereof is used.

The light receiving optical system 11R has a Hartmann pattern plate 28, a field lens 29 having a screen 29a on its upper surface, reflection mirrors 30 and 31, an optical path synthesizing prism 22, an image formation lens 23, and a CCD (photo receptor, light receiving means) 24. The pattern plate 28 is equipped with a multitude of light transmission portions (not shown) arranged in a matrix-like fashion.

At the center of this pattern plate 28, a pin-like lens rest shaft (lens rest) 28a protrudes upwards as a reference pin. This lens rest shaft 28a has a semi-spherical upper end portion, and is arranged such that its axis is in alignment with the optical axis OR of the measurement optical system 9R.

<Frame Retaining Mechanism>

Further, the apparatus main body 1 is equipped with a frame retaining mechanism constructed as follows for retaining the frame MF of the pair of spectacles 5 when the left and right spectacle lenses LL and RL are supported by the lens rest shafts 17a and 28a. Further, as shown in FIG. 9, in the horizontal central portions 32 and 33 of the front edge portion and the rear edge portion of the upper wall 7, there are formed slits 34 and 35 extending back and forth along the partition 3a.

Figure 6:
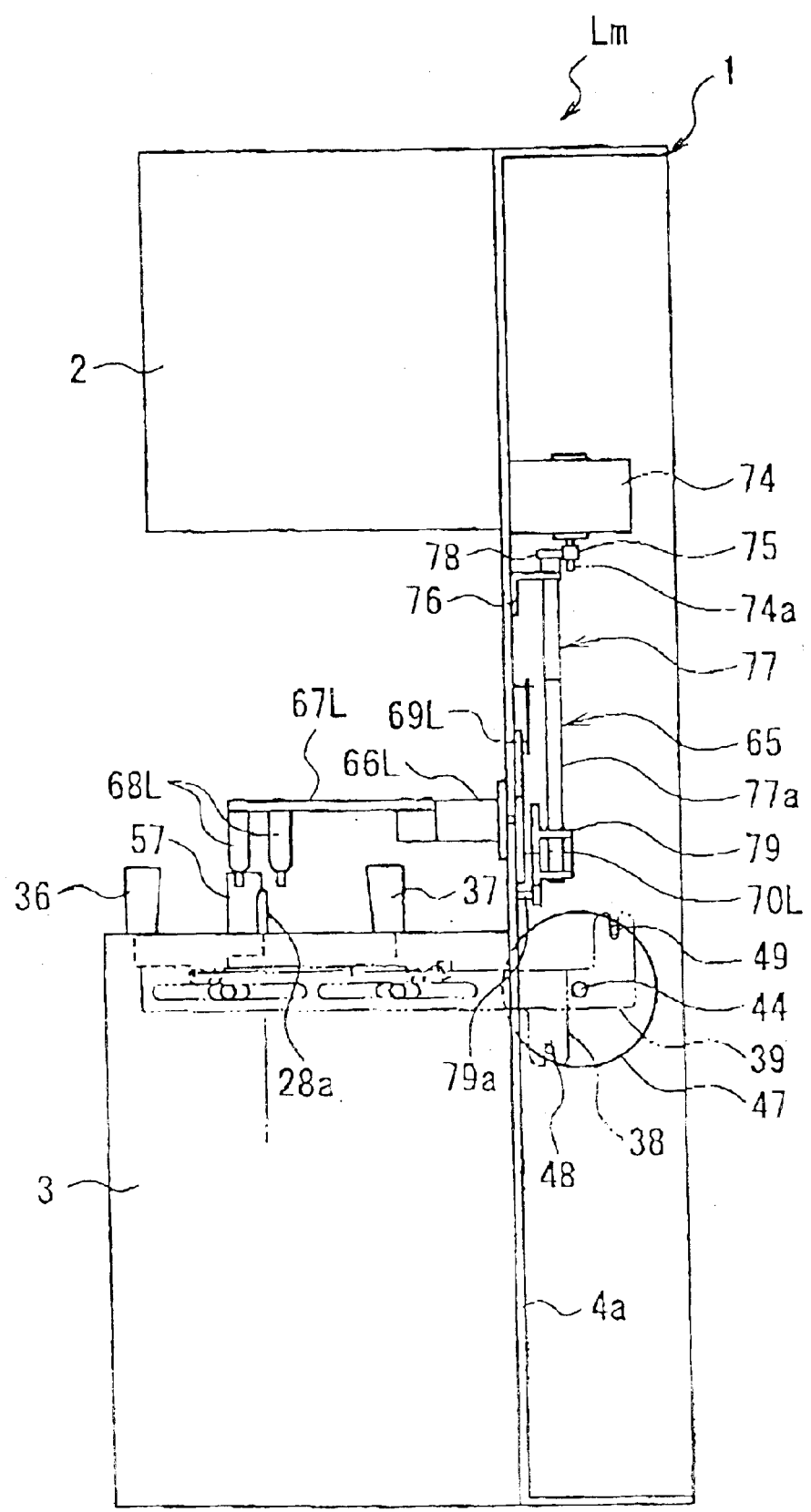
FIG. 6 is a side view, partly in section, of the lens meter, with a rear portion side of a joint casing as shown in FIGS. 2 through 4 removed.
Figure 8:
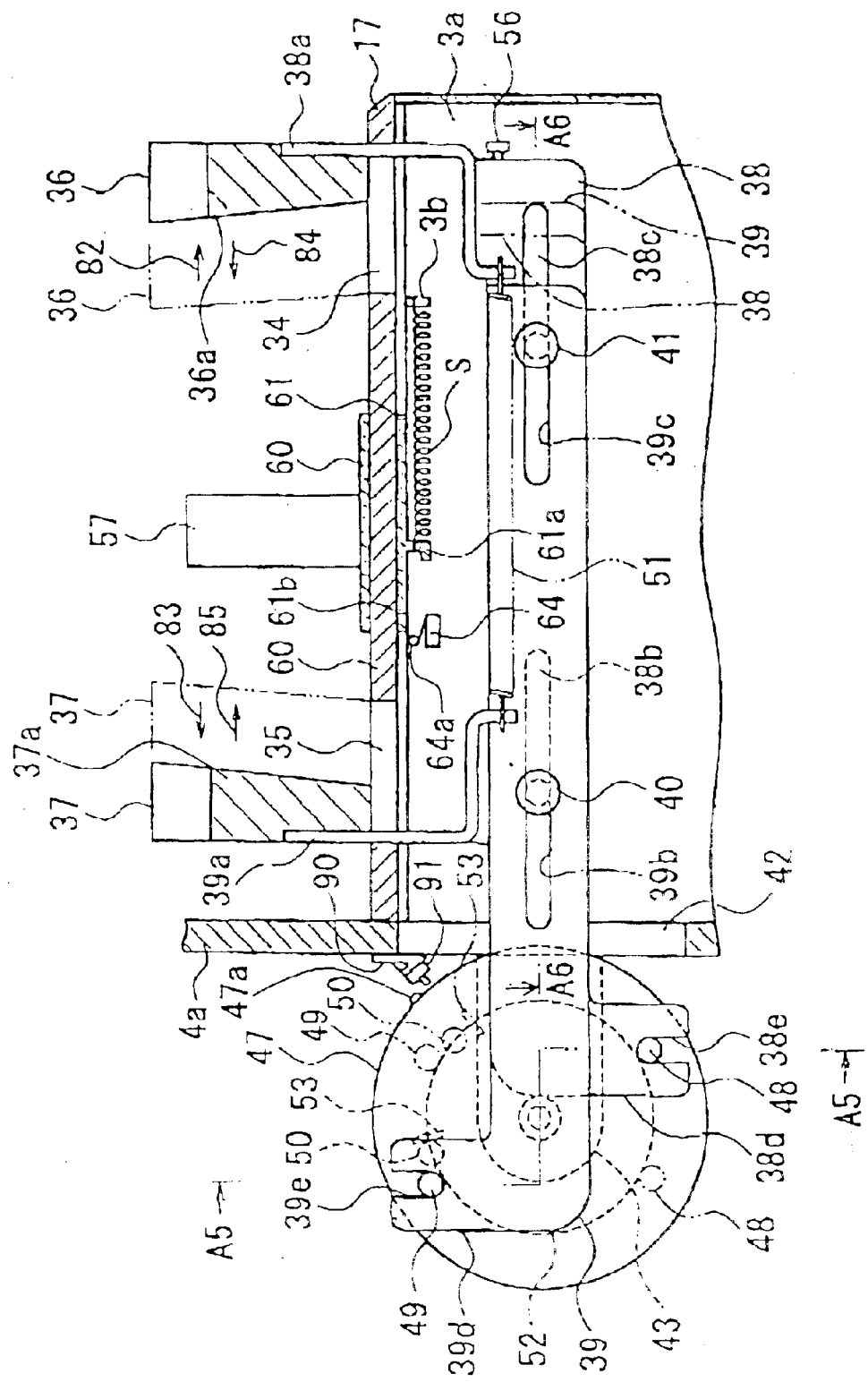
FIG. 8 is a sectional view taken along the line A2—A2 of FIG. 9, illustrating a frame retaining mechanism.

Further, this frame retaining mechanism has a pair of frame retaining plates 36 and 37 serving as frame retaining members (lens retaining members, lens rim retaining members) respectively arranged on the front edge portion and the rear edge portion of the upper wall 7 so as to extend in the horizontal direction. As shown in FIGS. 2, 6, and 8, these frame retaining plates 36 and 37 have opposing surfaces 36a and 37a formed as tapered surfaces slightly inclined downwards.

Figure 11:
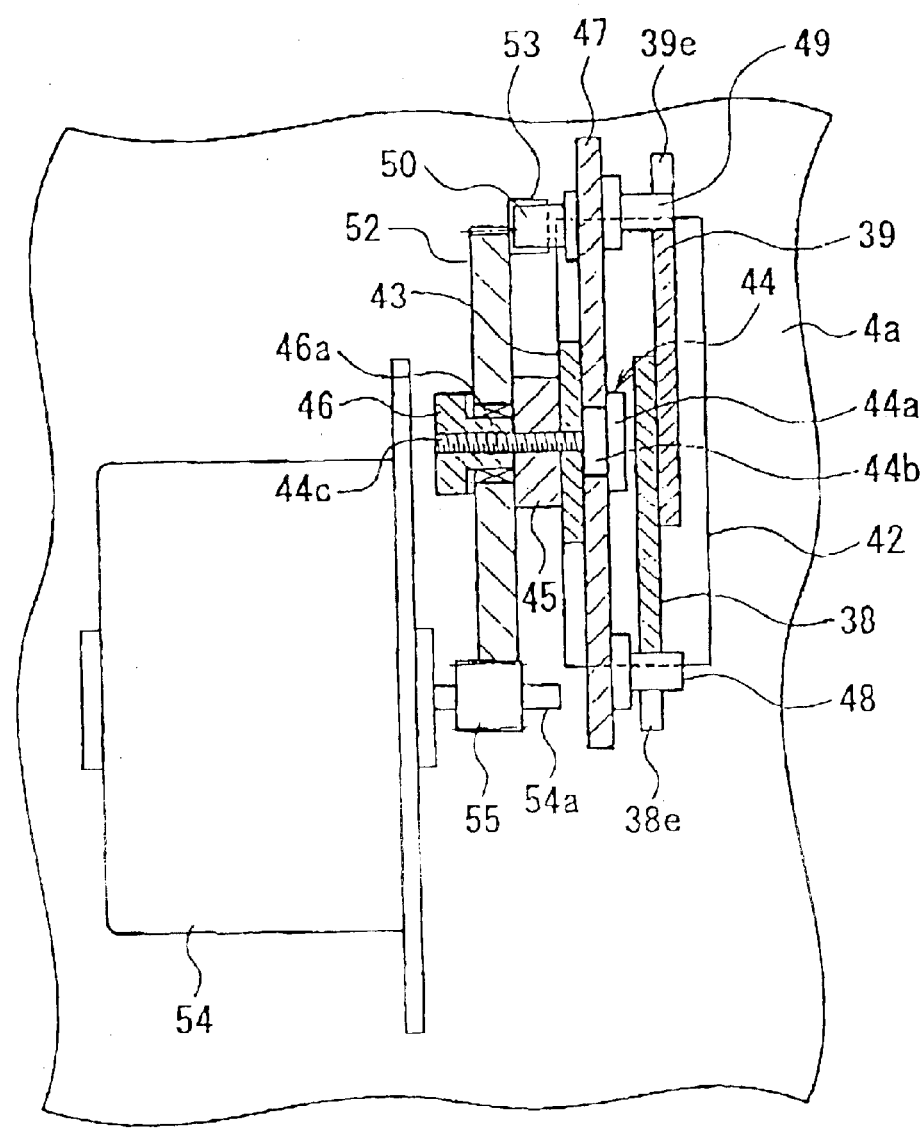
FIG. 11 is a sectional view taken along the line A5—A5 of FIG. 8.
Figure 12:
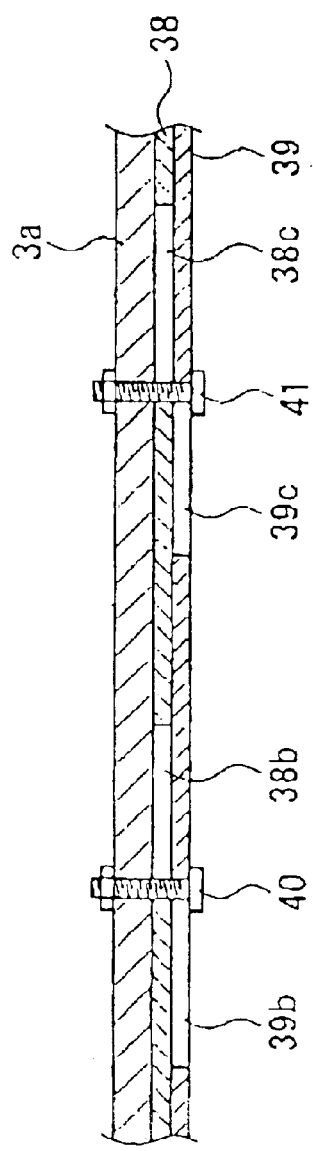
FIG. 12 is a sectional view taken along the line A6—A6 of FIG. 8.
Figure 13:
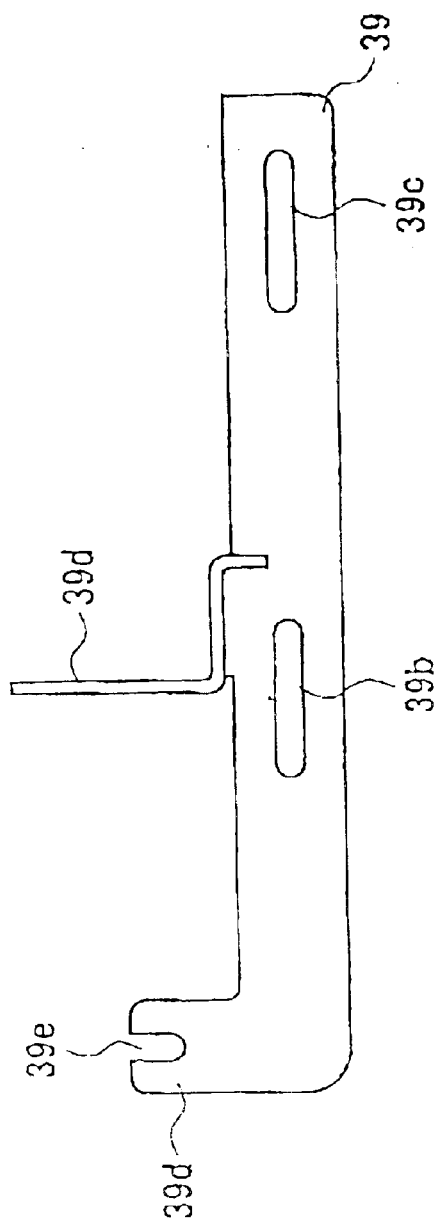
FIG. 13 is an explanatory view of one of a pair of linkage plates shown in FIGS. 8, 11, and 12.

Further, this frame retaining mechanism (lens rim retaining mechanism) has a pair of linkage plates (movement members, slide plates) 38 and 39 arranged inside the lower casing 3 (see FIGS. 8, 11, and 12). These linkage plates 38 and 39 are arranged so as to extend back and forth along the upper portion of one side surface of the partition 3a.

Figure 14:
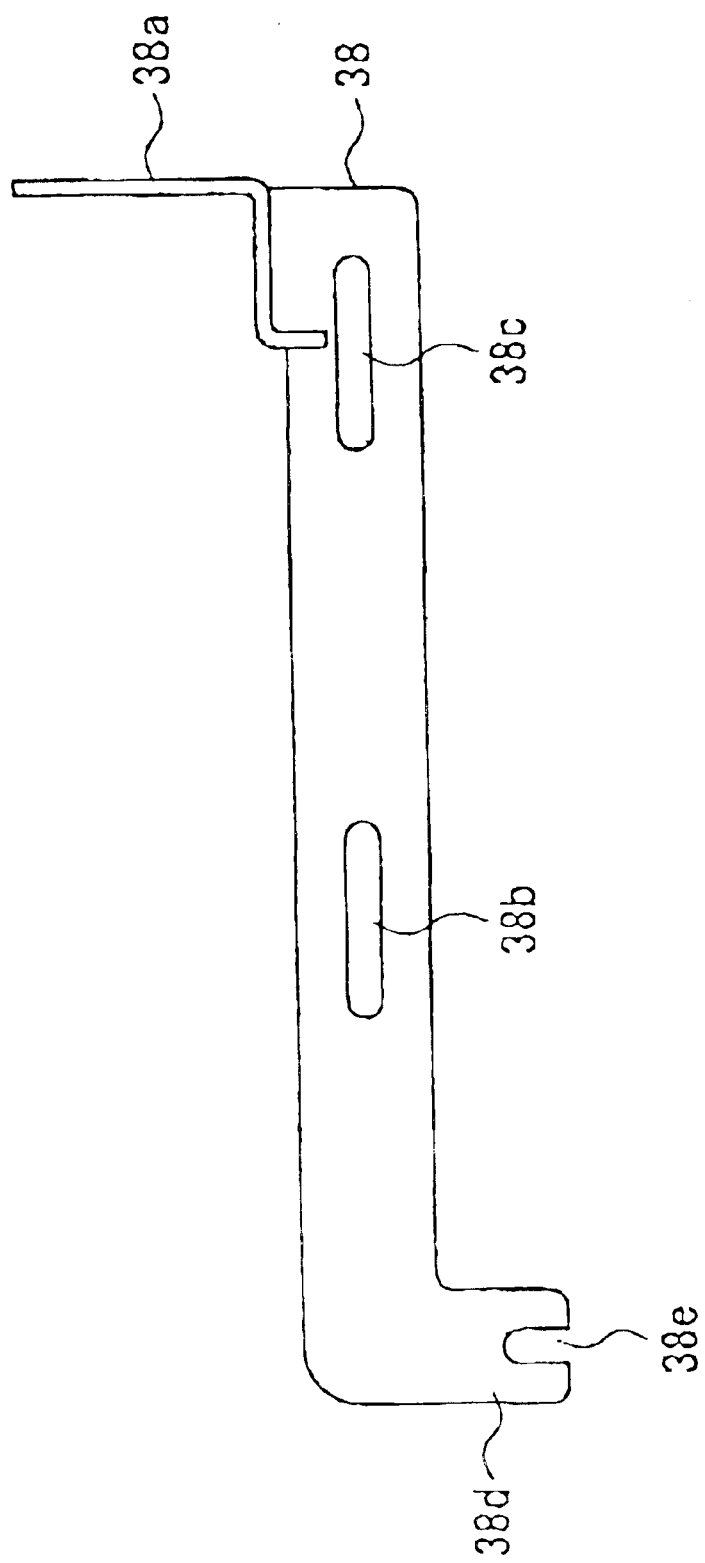
FIG. 14 is an explanatory view of the other of the pair of linkage plates shown in FIGS. 8, 11, and 12.

The linkage plate 38 has, at one end thereof, amounting member 38a protruding upwards as shown in FIGS. 8 and 14, slits 38b and 38c formed so as to be horizontally spaced apart from each other as shown in FIGS. 8, 12, and 14, an engagement member 38d protruding downwards from the other end thereof, and an engagement cutout 38e formed in the engagement member 38d so as to be directed downwards. In addition, the mounting member 38a protrudes beyond the upper wall 7 through the slit 34 and is mounted to the frame retaining plate 36.

The linkage plate 39 has a mounting member 39a protruding upwards from its longitudinal center, slits 39b and 39c formed at one end and in the intermediate portion thereof, an engagement member 39d protruding upwards from the other end thereof, and an engagement cutout 39e formed in the engagement member 39d so as to be directed upwards. In addition, the mounting member 39a protrudes beyond the upper wall 7 through the slit 35 and is mounted to the frame retaining plate 37.

A guide screw 40 is passed through the slits 38b and 39b of the linkage plates 38 and 39, respectively. After that, a forward end portion of the guide screw 40 threadedly engaged with the partition 3a. Further, a guide screw 41 is passed through the slits 38c and 39c of the linkage plates 38 and 39, respectively. After that, a forward end portion of the guide screw 41 threadedly engaged with the partition 3a. These guide screws 40 and 41 join (engage) the linkage plates 38 and 39 so as to allow longitudinally relative sliding displacement.

Figure 7:
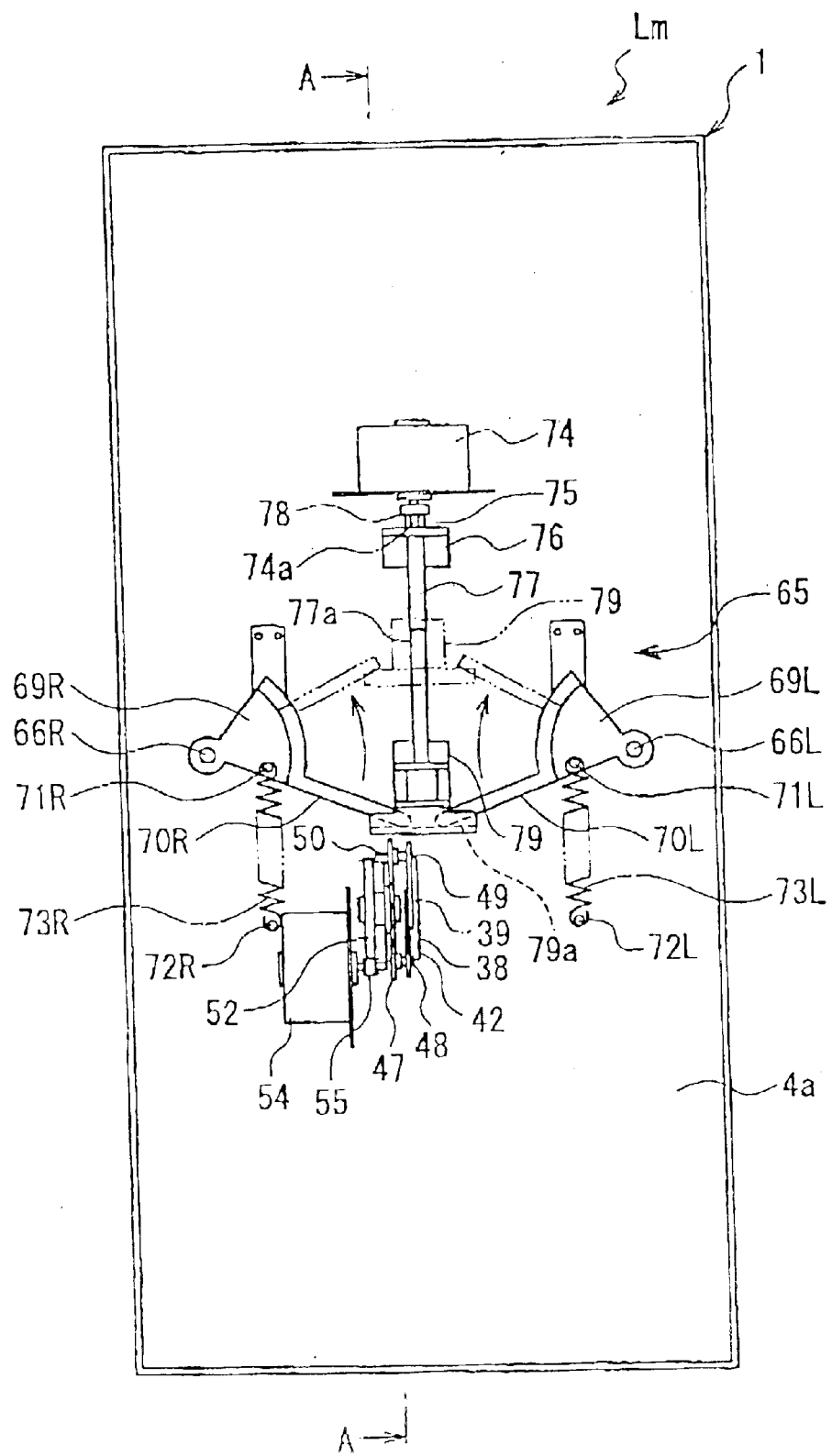
FIG. 7 is an explanatory view as seen from a back side of a front wall of the joint casing of the lens meter of FIG. 6.

Further, as shown in FIGS. 7, 8, and 11, the frame retaining mechanism has an opening 42 formed in the front wall 4a of the joint casing 4 in correspondence with the upper portion of the lower casing 3 and the position of the partition 3a, a support member 43 protruding rearwards (into the lower casing 3) at the side edge of the opening 42, and a support screw 44 mounted to the support member 43.

As shown in FIG. 11, this support screw 44 has a head portion 44a situated on the opening 42 side, a large diameter portion 44b connected to the head portion 44a, and a threaded portion 44c connected to the large diameter portion 44b. And, the support screw 44 is mounted to the support member 43 by threadedly engaging the threaded portion 44c with the support member 43. Further, the threaded portion 44c extends through the support member 43 to protrude on the side opposite to the opening 42. Further, as shown in FIG. 11, a ring-like spacer 45 is attached to the protruding portion of the threaded portion 44c, and a nut 46 is threadedly engaged therewith. This nut 46 has a small diameter portion 46a on the spacer 45 side, and secures the spacer 45 to the support member 43.

Further, the frame retaining mechanism has a rotary plate (connection member) 47 rotatably retained by the large diameter portion 44b, engagement pins 48 and 49 mounted to the linkage plate 38, 39 side portions of the rotary plate 47 at an interval of 180 degrees, and an engagement pin 50 protruding on the support member 43 side. And, the engagement pins 48 and 49 are engaged with the engagement cutouts 38e and 39e of the linkage plates 38 and 39. Further, a coil spring 51 is provided between the base portions of the mounting members 38a and 39a of the linkage plates 38 and 39, and the coil spring 51 elastically biases the linkage plates 38 and 39 such that the frame retaining plates 36 and 37 are brought close to each other.

Further, a gear 52 is rotatably supported by a small-diameter axial portion 46a of the nut 46 through the intermediation of a bearing, and integrally provided on the side surface of the gear 52 is an engagement protrusion 53 adapted to be circumferentially engaged with the engagement pin 50. In the vicinity of this gear 52, there is arranged a drive motor (driving means) 54 consisting of a pulse motor or the like mounted to the front wall 4a of the joint casing 4. Mounted to an output shaft 54a of this drive motor 54 is a pinion 55 in mesh with the gear 52. Further, mounted to the partition 3a is limit switch 56 as a position detecting means for detecting the movement stop position of the linkage plate 38 when the interval between the frame retaining plates 36 and 37 is maximum (see FIG. 8).

<Nose Pad Support Mechanism>

Further, as shown in FIG. 9, a semi-axial nose pad support member 57 is arranged on the upper wall 7 so as to be situated between the openings 8L and 8R and between the frame retaining plates 36 and 37. The nose pad support member 57 extends vertically and is semi-circular in plan configuration. A support shaft 58 protrudes from the lower end of the nose pad support member 57 (See FIG. 10).

Figure 10:
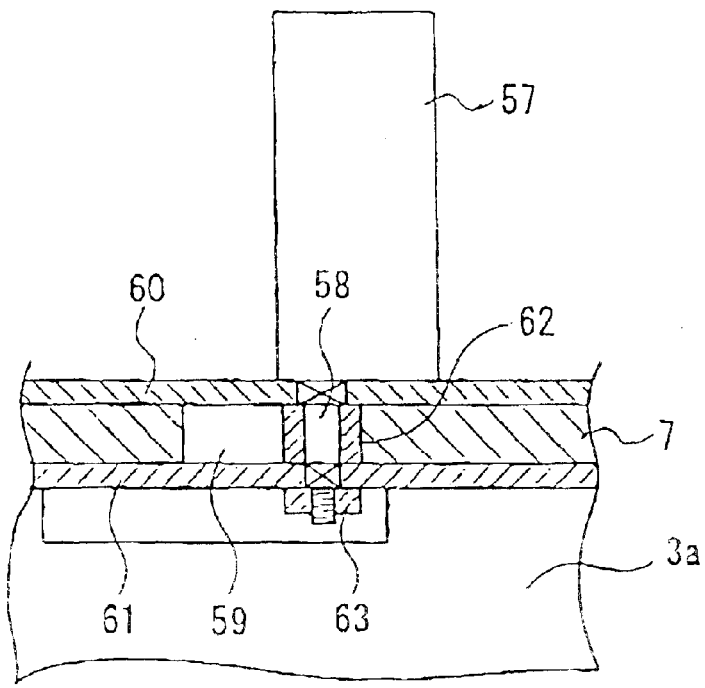
FIG. 10 is a sectional view taken along the line A4—A4 of FIG. 9.

Further, as shown in FIGS. 9 and 10, formed in the upper wall 7 is a slit 59 situated between the openings 8L and 8R and extending in the back and forth direction. The support shaft 58 protruding from the lower end of the nose pad support member 57 is inserted into the slit 59. Further, on the top and under sides of the upper wall 7, support plates 60 and 61 extending along the slit 59 are arranged, and the support shaft 58 extends through the support plates 60 and 61. Further, a spacer cylinder 62 fitted onto the support shaft 58 is provided between the support plates 60 and 61, and a fixation nut 63 is threadedly engaged with the lower end portion of the support shaft 58. The fixation nut 63 serves to fix the support plates 60 and 61 and the spacer cylinder 62 integrally to the nose pad support member 57.

The spacer 62 is arranged inside the slit 59 so as to be longitudinally movable and laterally immovable. Further, the length of the spacer cylinder 62 is formed so as to be slightly larger than the thickness of the upper wall 7, and the support plates 60 and 61 are movable along the plate surface of the upper wall 7. The support shaft 58 and the support plates 60 and 61 make no relative rotation.

Further, a coil spring S is provided between a spring hook protrusion 61a of the support plate 61 and a spring hook protrusion 3b of the partition 3a, and the coil spring S biases the support plates 60 and 61 and the nose rest support member 57 toward the frame retaining member 36. Further, a microswitch 64 is mounted as movement detecting means to the partition 3a in correspondence with the position of the frame retaining plate 37 side end 61b of the support plate 61. When the nose pad support member 57 and the support plates 60 and 61 are moved to the frame retaining plate 37 side, an actuator 64a of the microswitch 64 is pressed against the end portion 61b of the support plate 61 to turn ON the microswitch 64, whereby displacement of the nose pad support member 57 is detected.

<Lens Presser Mechanism>

As shown in FIGS. 6 and 7, a lens presser mechanism 65 as the lens presser means is provided in the front wall 4a of the joint casing 4. The lens presser means 65 has rotation shafts 66L and 66R provided above the frame retaining plate 37 and respectively to the right and left side portions of the front wall 4a so as to be rotatable. The rotation shafts 66L and 66R protrude from the front wall 4a toward the user side so as to be parallel to each other.

Figure 19:
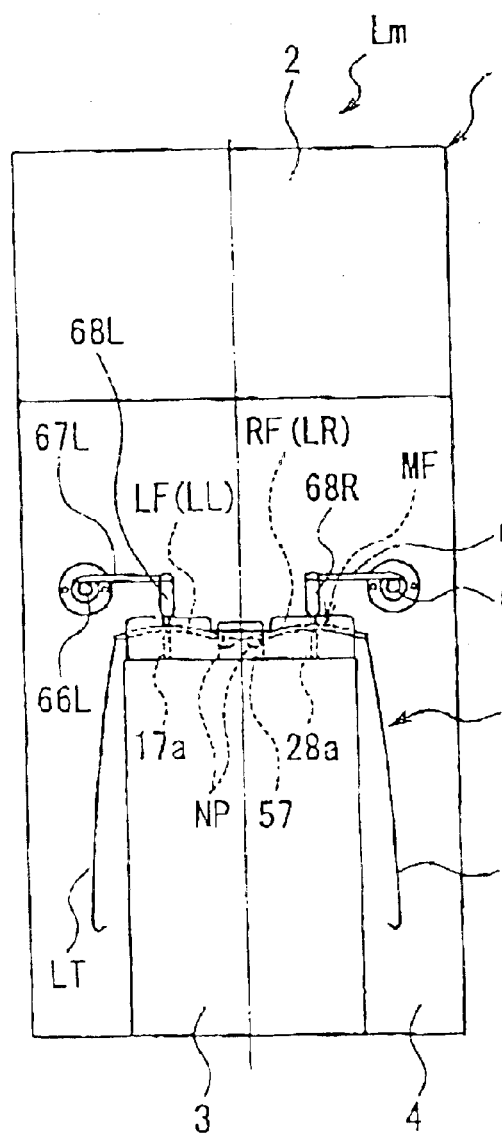
FIG. 19(A) is an operational explanatory view, as seen from the front side, of the lens meter shown in FIGS. 1 through 14.
FIG. 19(B) is a right-hand side view of FIG. 19(A)
Figure 19:
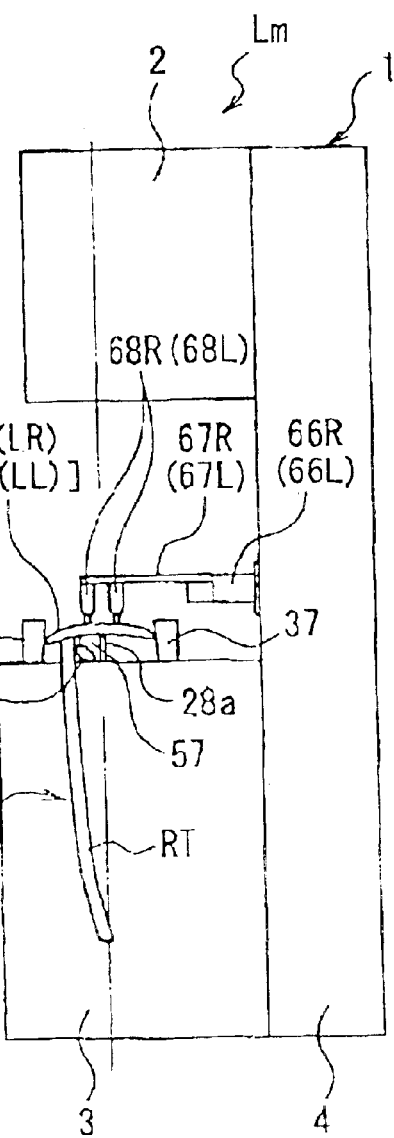

Further, the lens presser mechanism 65 has L-shaped arms 67L and 67R respectively fixed to the rotation shafts 66L and 66R, a pair of lens presser shafts 68L mounted to the forward end portion of the arm 67L (see FIG. 19(B)), and a pair of lens presser shafts 68R mounted to the forward end portion of the arm 67R (see FIG. 19(B)).

In front view of the lens meter 1, only one of each pair of the lens presser shafts 68L and 68R is visible, whereas in the right-hand side view of the lens meter 1 of FIG. 19(A), a pair of lens presser shafts 68R are visible as shown in FIG. 19(B). In that case, the pair of lens presser shafts 68L are situated so as to overlap the pair of lens presser shafts 68R. Thus, for convenience of illustration, the lens presser shafts 68L and 68R will be described collectively. The forward end portions of the lens presser shafts 68L and 68R are formed in a pin-like configuration.

Further, when the arms 67L and 67R are raised as shown in FIGS. 1 and 2, the forward end portions of the lens presser shafts 68L and 68R are opposed to each other as shown in FIG. 1.

When the arm 67L (67R) is tilted to the horizontal position as shown in FIG. 6, the lens presser shafts 68L (68R) are arranged back and forth in the axis of the lens rest 17a (28a) serving as the reference pin, i.e., in the optical axis OL (OR).

Further, as shown in FIGS. 6 and 7, the lens presser mechanism 65 has substantially sector-shaped rotation plates 69L and 69R respectively fixed to rotation shafts 66L and 66R inside the joint casing 4, narrow engagement members 70L and 70R connected to the lower edge portions of the rotation plates 69L and 69R, spring engagement portions 71L and 71R provided at the lower edges of the rotation plates 69L and 69R, spring engagement portions 72L and 72R situated below the spring engagement portions 71L and 71R and protruding from the front wall 4a, an extension coil spring 73L provided between the spring engagement portions 71L and 72L, and an extension coil spring 73R provided between the spring engagement portions 71R and 72R.

Further, the lens presser mechanism 65 has a drive motor 74 consisting of a pulse motor or the like mounted to the upper portion of the front wall 4a inside the joint casing 4. The drive motor 74 has an output shaft 74a vertically oriented and arranged at the lateral center of the joint casing 4. And, a pinion 75 is mounted to the output shaft 74a. Further, an L-shaped bracket 76 is mounted to the front wall 4a so as to be situated below the drive motor 74. The upper end portion of a feed screw 77 vertically extending along the front wall 4a is retained by the bracket 76 so as to be rotatable and vertically immovable. Further, although not shown, it is also possible to fix a vertically directed axial bearing to the bracket 76, retaining the upper end portion of the feed screw 77 by means of this bearing so as to keep it rotatable and vertically immovable. Further, it is also possible to provide a plurality of bearings vertically spaced apart from each other. Further, it is also possible for the upper and lower end portions of the feed screw 77 to be rotatably supported on the front wall 4a by means of bearings.

Mounted to the upper end portion of the feed screw 77 is a gear 78 in mesh with the pinion 75. This feed screw 77 is arranged at the lateral center of the joint casing 4, and an ascent/descent member 79 is threadedly engaged with the screw portion 77a in the lower portion of the feed screw 77. A flange 79a extending horizontally in FIG. 7 protrudes from the lower end portion of the ascent/descent member 79 toward the front wall 4a. This flange 79a is in contact with the front wall 4a, and slides vertically with respect to the front wall 4a while in contact with the front wall 4a, due to ascent/descent of the ascent/descent member 79. Further, the forward end portions of the engagement members 70L and 70R are held in contact with the flange 79a by the elastic force of extension springs 73L and 73R.

<Control Circuit>

The output (measurement signal) of the above-mentioned CCD 24 is input to the computation control circuit (computation control means) 80 of FIG. 5, and the limit switch 56 and the microswitch 64 are connected to the computation control circuit 80. Further, the computation control circuit 80 performs lighting control on the LEDs 12, 13, 25, and 26, to control the drive motors 54 and 74. Further, a measurement start switch Sa is connected to the computation control circuit 80.

[Operation]

Next, an operation of this lens meter, constructed as described above, will be described.

(Before Turning on the Power)

As shown in FIG. 8, before turning on the power of this lens meter, the engagement protrusion 53 of the gear 52 is arranged at the position as indicated by the two-dotted chain line. At this time, as shown in FIGS. 8 and 15(B), the frame retaining plates 36 and 37 are arranged at the positions as indicated by the two-dotted chain lines by the tension of the coil spring 51, and the interval between the frame retaining plates 36 and 37 is minimum. In this state, the engagement pins 48, 49, and 50 are arranged at the positions indicated by the two-dotted chain lines, and the engagement protrusion 53 is arranged at a position slightly spaced apart clockwise from the engagement pin 50.

Further, before turning on the power of the lens meter, the ascent/descent member 79 is situated at the lower end of the screw portion 77a of the feed screw 77 as indicated by the solid line in FIG. 7. In this state, the engagement members 70L and 70R of the rotation plates 69L and 69R are downwardly inclined as shown by the solid lines in the drawing, and the arms 67L and 67R are in the horizontal position.

(Initialization by Turning on the Power)

When the power of the lens meter 1 is turned on in this state, the computation control circuit 80 detects displacement of the nose pad support member 57, and, in correspondence therewith, the operation of the drive motor 54 is controlled to rotate the pinion 55, thus rotating the gear 52 counterclockwise in FIG. 8 through the rotation of the pinion 55. As a result of this rotation, the engagement protrusion 53 protruding from the side surface of the gear 52 abuts the engagement pin 50 of the rotation plate 47, and then rotates the engagement pin 50 counterclockwise in FIG. 8, thereby rotating the rotation plate 47 counterclockwise.

As a result of this rotation of the rotation plate 47, the engagement pins 48 and 49 are rotated counterclockwise integrally with the rotation plate 47 from the positions indicated by the two-dotted chain lines, and the linkage plates 38 and 39 are displaced in opposite directions against the tension of the coil spring 51. That is, in FIG. 8, the linkage plate 38 is displaced from an initial position (not shown) to the right to the position indicated by the solid line, and the linkage plate 39 is displaced from the initial position (not shown) to the left to the position indicated by the solid line. When the linkage plate 38 is displaced to the position indicated by the solid line in FIG. 8, the limit switch 56 is turned on by an end portion of the linkage plate 38, and the resultant ON signal is input to the computation control circuit 80. Upon the input of the ON signal from the limit switch 56, the computation control circuit 56 stops the operation of the drive motor 54.

Figure 15:
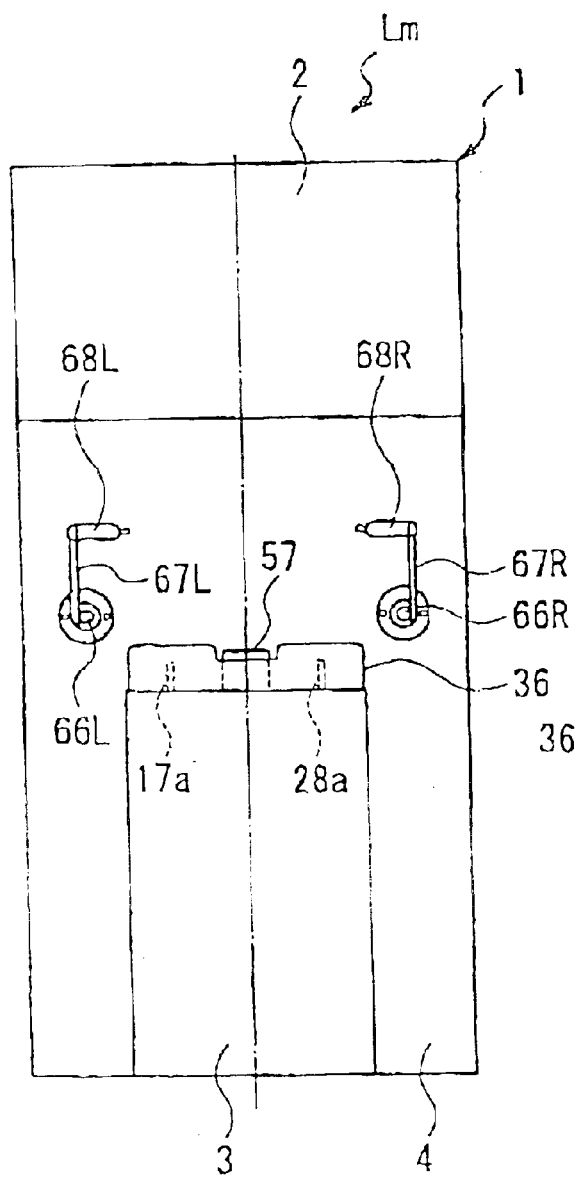
FIG. 15(A) is an operational explanatory view, as seen from a front side, of the lens meter shown in FIGS. 1 through 14.
FIG. 15(B) is a right-hand side view of FIG. 15(A)
Figure 15:
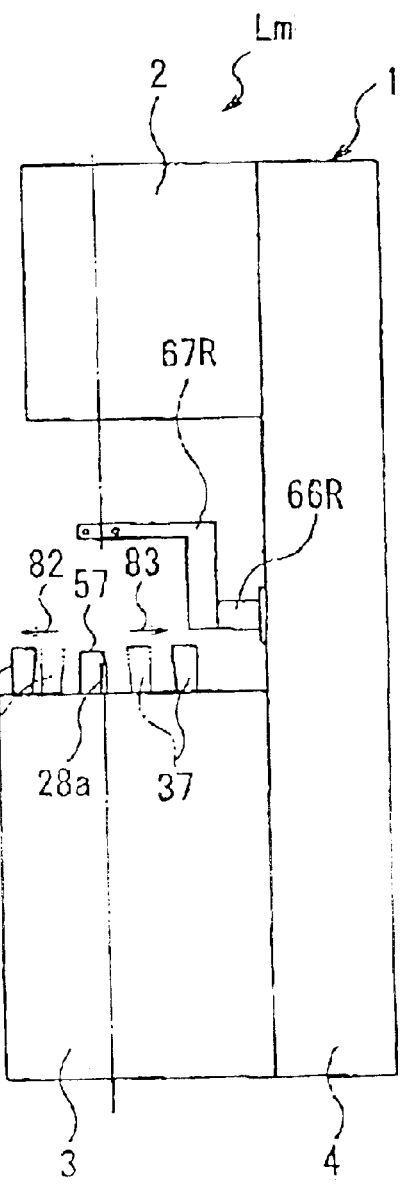

Through this relative displacement of the linkage plates 38 and 39, the frame retaining plates 36 and 37 are displaced from the positions indicated by the two-dotted chain lines in FIGS. 8 and 15 (B) to the positions indicated by the solid lines respectively in the directions of the arrows 82 and 83 (i.e., in opposite directions), and the interval between the frame retaining plates 36 and 37 becomes maximum, bringing the system into a measurement standby mode.

Further, in response to the turning-on of the lens meter 1, the computation control circuit 80 operates the drive motor 74 of FIGS. 6 and 7 to rotate the pinion 75, and transmits the rotation of the pinion 75 to the feed screw 77 through the gear 78, and then the ascent/descent member 79 is displaced to the upper end portion of the screw portion 77a of the feed screw 77 as indicated by the two-dotted chain line in FIG. 7. Thus, before the measurement is started, the engagement members 70L and 70R of the rotation plates 69L and 69R are upwardly inclined as indicated by the two-dotted chain lines, and the arms 67L and 67R are raised as shown in FIGS. 1 and 2 with forward end portions of the lens presser shafts 68L and 68R being opposed to each other as shown in FIG. 1 to bring the system into a measurement standby state.

(Arrangement and Retention of the Spectacles)

Figure 16:
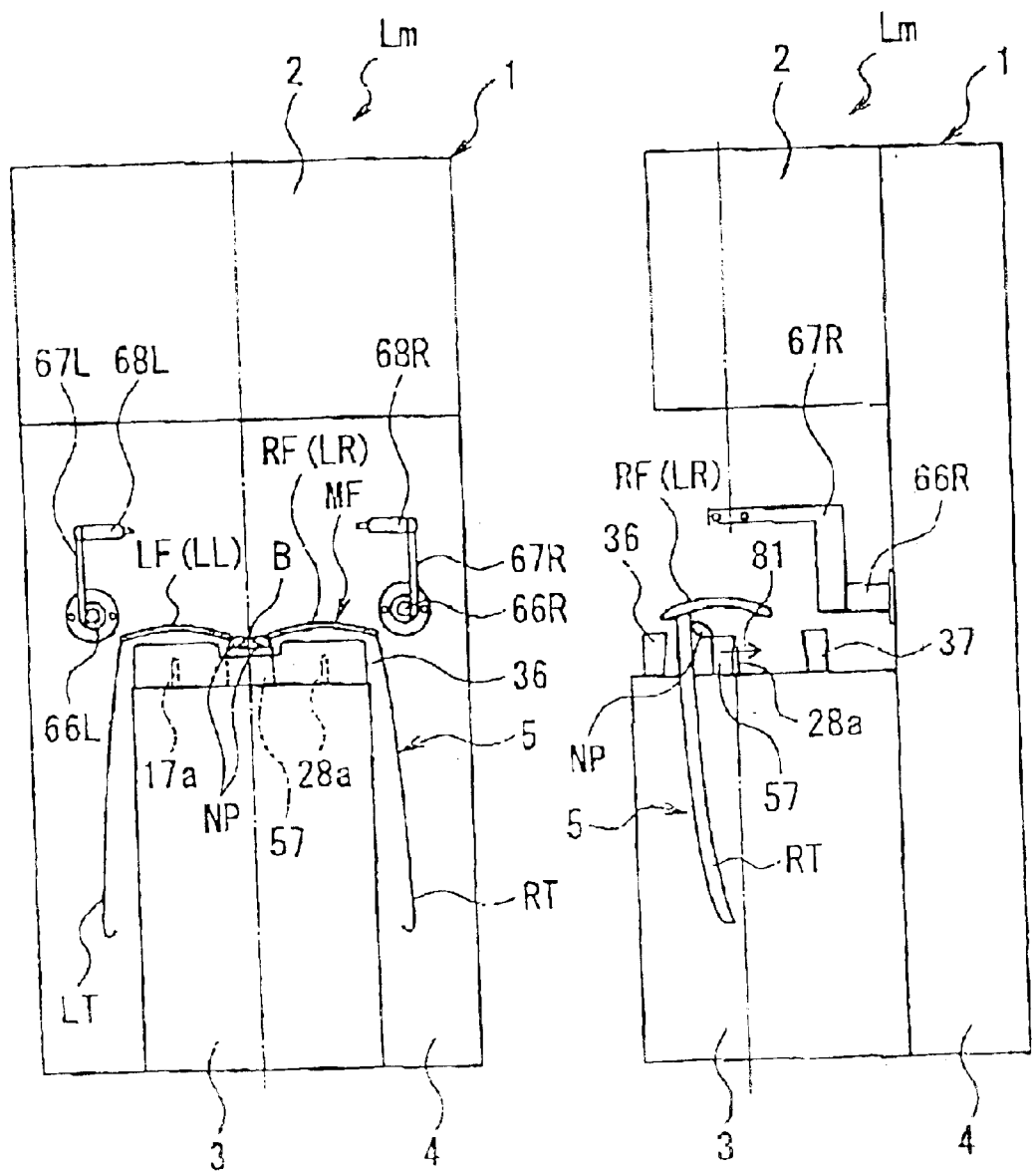
FIG. 16(A) is an operational explanatory view, as seen from the front side, of the lens meter shown in FIGS. 1 through 14.
FIG. 16(B) is a right-hand side view of FIG. 16(A)

To measure the optical characteristics, such as the refraction characteristics, of the pair of spectacles 5 by the lens meter in this state, the nose pads NP of the spectacles 5 are first brought into contact with the front surface of the upper end portion of the nose pad support member 57 as shown in FIGS. 16(A) and 16(B), and the spectacles 5 are pressed against the nose pad support member 57 toward the frame retaining plate 37 side, whereby the nose pad support member 57 is moved toward the frame retaining plate 37 side as indicated by the arrow 81 of FIG. 16(B) against the spring force of the coil spring S, and the frame MF of the spectacles 5 is lowered to arrange it between the frame retaining plates 36 and 37.

In this process, when the support plates 60 and 61 are moved integrally with the nose pad support member 57 toward the frame retaining plate 37 side through the movement of the nose pad support member 57, the actuator 64a of the microswitch 64 is depressed by the end portion 61a of the support plate 61 and is thereby turned on. The resultant ON signal is input to the computation control circuit 80, and the movement of the nose pad support member 57 is detected.

When the ON signal from the microswitch 64 in input thereto, the computation control circuit 80 operation-controls the drive motor 54 with a predetermined number of driving pulses to rotate the pinion 55 by a predetermined revolution, and the gear 52 is rotated clockwise in FIG. 8 by the pinion 55, rotating clockwise the engagement protrusion 53 protruding from the side surface of the gear 52. The rotation of the drive motor 54 is continued until the engagement protrusion 53 moves to the position indicated by the two-dotted chain line. It is also possible to detect this position by a microswitch, limit switch, or the like to stop the drive motor 54.

As a result, the engagement pin 50 of the rotation plate 47 is driven by the tension of the coil spring 51 and is moved with the engagement protrusion 53 to be thereby rotated clockwise in FIG. 8, and the rotation plate 47 rotates clockwise integrally with the engagement pin 50.

As the rotation plate 47 thus rotates, the engagement pins 48 and 49 are rotated clockwise integrally with the rotation plate 47 from the positions indicated by the solid lines, and the linkage plates 38 and 39 are displaced in opposite directions by the tension of the coil spring 51. In this process, the linkage plate 38 is displaced to the left in FIG. 8, and the frame retaining plate 36 is displaced to the left integrally with the linkage plate 38 as indicated by the arrow 84 in FIG. 8. At the same time, the linkage plate 39 is displaced to the right, and the linkage plate 39 integrally with the frame retaining plate 37 is displaced to the right as indicated by the arrow 85 in FIG. 8.

Figure 17:
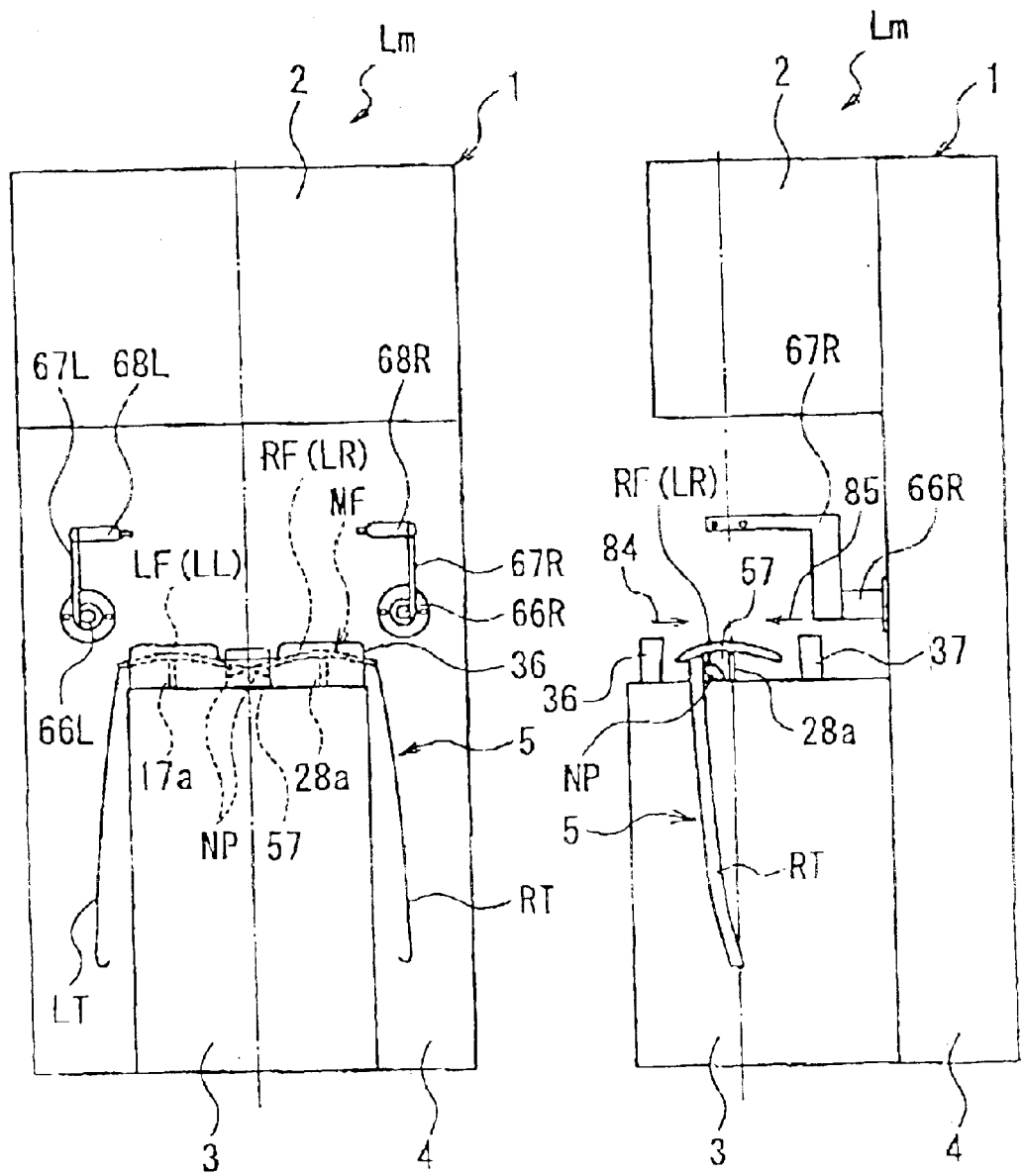
FIG. 17(A) is an operational explanatory view, as seen from the front side, of the lens meter shown in FIGS. 1 through 14.
FIG. 17(B) is a right-hand side view of FIG. 17(A)
Figure 18:
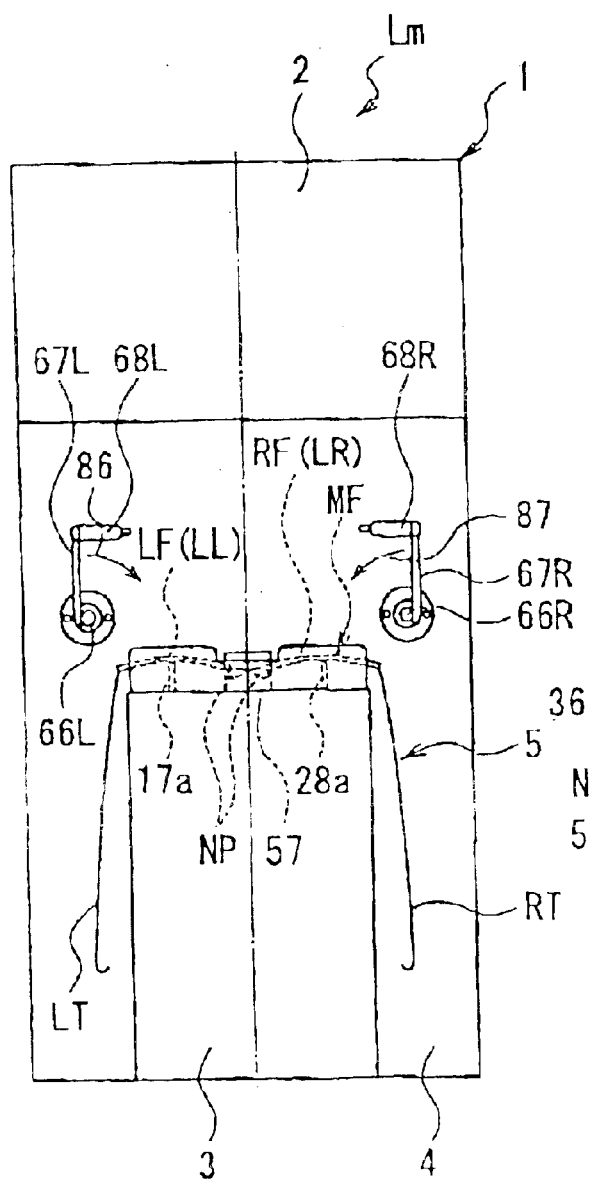
FIG. 18(A) is an operational explanatory view, as seen from the front side, of the lens meter shown in FIGS. 1 through 14.
FIG. 18(B) is a right-hand side view of FIG. 18(A)
Figure 18:
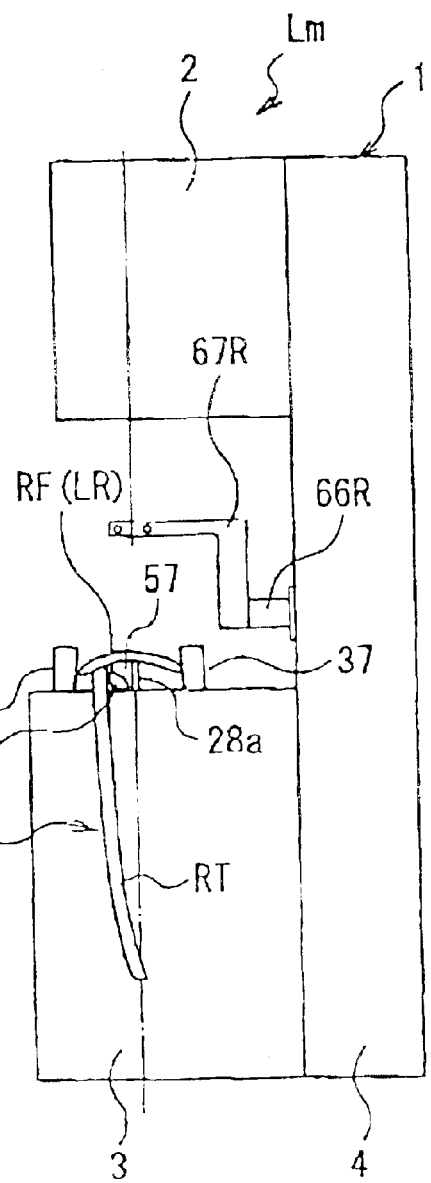

As a result, the frame retaining plates 36 and 37 are moved toward each other as indicated by the arrows 84 and 85 in FIG. 17(B) to retain (hold) the frame MF of the pair of spectacles 5 between the inclined opposing surfaces 36*a* and 37*a* as in FIG. 18(B).

In the state in which the spectacle frame MF is thus retained (held) between the inclined opposing surfaces 36*a* and 37*a*, the micro-switch 64 is kept ON by the support plate 61 of the limit switch 64. Further, as shown in FIG. 5, in this embodiment, the lens rim LF of the spectacle frame MF and the spectacle lens LL have substantially the same thickness, and the lens rim RF of the spectacle frame MF and the spectacle lens LR have substantially the same thickness, so that, in the description given with reference to FIGS. 16 through 20, the same portion is indicated by symbols LL and LF, and the same portion is indicated by the symbols LR and RF.

(Correction of the Setting State of the Spectacle Frame)

Next, when the measurement start switch Sa is depressed, the computation control circuit 80 operation-controls the drive motor 74 with a predetermined number of driving pulses to rotate the pinion 75, and this rotation is transmitted to the feed screw 77 through the gear 78 with the ascent/descent member 79 being moved downwards by this feed screw 77 from the position indicated by the two-dotted chain line. In this process, the operation of the drive motor 74 is continued until the ascent/descent member 79 reaches the lower end of the feed screw 77. Then, when the ascent/descent member 79 reaches the lower end of the feed screw 77, the operation of the drive motor 74 is stopped. This operation can be conducted by rotating the drive motor 74, consisting of a pulse motor, by a predetermined revolution. Further, it is also possible to detect the vertical moving position of the ascent/descent member 79 by a position detecting means, such as a microswitch, stopping the operation of the drive motor 74 in response to a detection signal from the position detecting means.

Then, as the ascent/descent member 79 moves downwards, the forward end portions of the engagement members 70L and 70R of the rotation plates 69L and 69R move downwards with the flange 79*a* of the ascent/descent member 79, and the rotation plate 69L is rotated counterclockwise in FIG. 7 by the elastic force of the coil spring 73L, and further, the rotation plate 69R is rotated clockwise in FIG. 7 by the elastic force of the coil spring 73R.

These rotations of the rotation plates 69L and 69R are transmitted to the arms 67L and 67R through the rotation shafts 66L and 66R. Accordingly, the arm 67L and the lens presser shaft 68L are rotated counterclockwise as indicated by the arrow 86 of FIG. 18(A), and the arm 67R and the lens presser shaft 68R are rotated counterclockwise as indicated by the arrow 87 of FIG. 18(A). In this way, the lens presser shafts 68L and 68R descend while rotating to press the forward end portions of the left and right spectacle lenses LL and LR of the pair of spectacles 5 respectively against the lens rest shafts 17*a* and 28*a*.

In this process, even if the spectacle lenses LL and LR are arranged so as to be inclined in the back and forth direction of the lens meter, the two lens presser shafts (lens presser members) 68L, 68L press both sides of the axis of the lens rest shaft 17*a* (which is in alignment with the optical axis OL), and the two lens presser shafts 68R, 68R press both sides of the axis of the lens rest shaft 28*a* (which is in alignment with the optical shaft OR), so that the spectacle frame MF is accurately retained between the inclined opposing surfaces 36*a* and 37*a* of the frame retaining plates 36 and 37, with the inclination of the spectacle lenses LL and LR in the horizontal direction being corrected. In this process, the force with which the spectacle lenses LL and LR are pressed by the lens presser shafts 68L, 68L is provided solely by the elastic force of the coil springs 73L and 73R.

Figure 20:
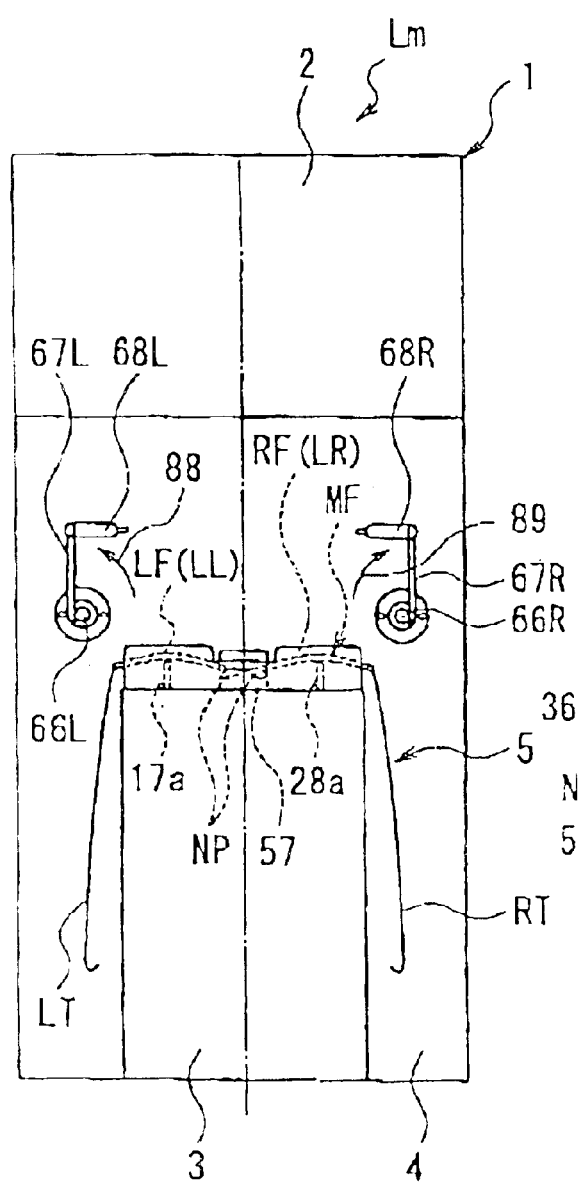
FIG. 20(A) is an operational explanatory view, as seen from the front side, of the lens meter shown in FIGS. 1 through 14.
FIG. 20(B) is a right-hand side view of FIG. 20(B).
Figure 20:
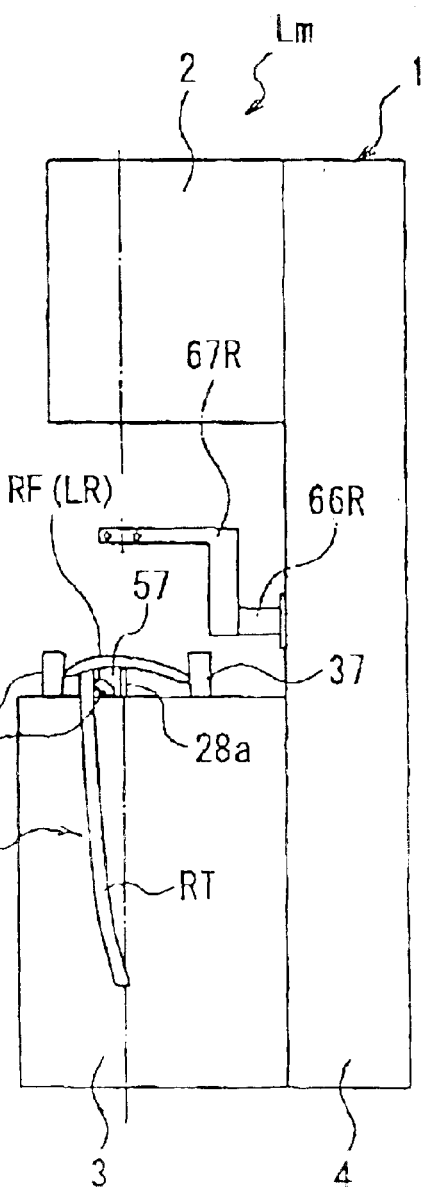

Thereafter, the computation control circuit 80 operationally controls, contrarily to the above, the drive motor 74 with a predetermined number of driving pulses to raise the ascent/descent member 79, and forward end portions of the engagement members 70L and 70R are raised by this ascent/descent member 79, whereby the rotation plates 69L and 69R are rotated in a direction opposite to the above against the elastic force of the coil springs 73L and 73R, rotating the arms 67L and 67R vertically until they are directed upwards as indicated by the arrows 88 and 89 in FIG. 20. In this state, the lens presser shafts 68L and 68R mounted to the arms 67L and 67R are retracted from above the Hartmann plates 17 and 28 horizontally, so that the lens presser shafts 68L and 68R do not intercept the measurement beams.

(Measurement of Refraction Characteristics)

<Measurement of the Refraction Characteristics of the Spectacle Lens LL>

In this state, the computation control circuit 80 successively lights the LEDs 12 and 13 of the measurement optical system 9L to execute measurement on the spectacle lens LL. In this process, the measurement beam from the LED 12 is reflected by the dichroic mirror 14L and the reflection mirror 15, and then converted into a parallel beam by a collimating lens 16 before being projected onto the spectacle lens LL. The measurement beam transmitted through the spectacle lens LL is transmitted through the pattern plate 17 to become a multitude of measurement beams, which are projected onto the upper surface of the field lens 18. The multitude of measurement beams projected onto the upper surface of the field lens 18 are guided to the CCD 24 by way of the field lens 16, the reflection mirrors 19, 20, and 21, the optical path synthesizing prism 22, and the image formation lens 23. In this process, the image formation lens 23 forms a pattern image of the pattern plate 17 on the CCD 24.

Further, the measurement beam from the LED 13 is transmitted through the dichroic mirror 14L and reflected by the reflection mirror 15, and then converted into a parallel beam by the collimating lens 16 before being projected onto the spectacle lens LL. The measurement beam transmitted through the spectacle lens LL is transmitted through the pattern plate 17 to become a multitude of measurement beams, which are projected onto the upper surface of the field lens 18. The multitude of measurement beams projected onto the upper surface of the field lens 18 are guided to the CCD 24 by way of the field lens 16, the reflection mirrors 19, 20, and 21, the optical path synthesizing prism 22, and the image formation lens 23. In this process, the image formation lens 23 forms a pattern image of the pattern plate 17 on the CCD 24.

Then, the computation control circuit 80 measures the refraction characteristics of each portion of the spectacle lens LL based on the state of the pattern images formed on the CCD 24, and obtains mapping data on the refraction characteristics of each portion of the spectacle lens LL. The refraction characteristics include spherical degree (S), cylindricity (C), and axial axial angle (A).

<Measurement of the Refraction Characteristics of the Spectacle Lens LR>

On the other hand, the computation control circuit 80 successively lights the LEDs 25 and 26 of the measurement optical system 9R to execute measurement on the spectacle lens LR. In this process, the measurement beam from the LED 25 is reflected by the dichroic mirror 14R and the reflection mirror 15, and then converted into a parallel beam by a collimating lens 27 before being projected onto the spectacle lens LR. The measurement beam transmitted through the spectacle lens LR is transmitted through the pattern plate 28 to become a multitude of measurement beams, which are projected onto the upper surface of the field lens 29. The multitude of measurement beams projected onto the upper surface of the field lens 29 are guided to the CCD 24 by way of the field lens 29, the reflection mirrors 30 and 31, the optical path synthesizing prism 22, and the image formation lens 23. In this process, the image formation lens 23 forms a pattern image of the pattern plate 28 on the CCD 24.

Further, the measurement beam from the LED 26 is transmitted through the dichroic mirror 14R and reflected by the reflection mirror 15, and then converted into a parallel beam by the collimating lens 27 before being projected onto the spectacle lens LR. The measurement beam transmitted through the spectacle lens LR is transmitted through the pattern plate 28 to become a multitude of measurement beams, which are projected onto the upper surface of the field lens 29. The multitude of measurement beams projected onto the upper surface of the field lens 29 are guided to the CCD 24 by way of the field lens 29, the reflection mirrors 30 and 31, the optical path synthesizing prism 22, and the image formation lens 23. In this process, the image formation lens 23 forms a pattern image of the pattern plate 28 on the CCD 24.

Then, the computation control circuit 80 measures the refraction characteristics of each portion of the spectacle lens LR based on the state of the pattern images formed on the CCD 24, and obtains mapping data on the refraction characteristics of each portion of the spectacle lens LR. The refraction characteristics include spherical degree (S), cylindricity (C), and cylindrical axial angle (A).

Further, the computation control circuit 80 is capable of transmitting the refraction characteristics (optical characteristics) of the spectacle lens LL and LR thus obtained to another ophthalmic apparatus (not shown) through a transmission means (network, cable, or radio). Note that it is also possible to provide a liquid crystal display (display means) on the front surface of the upper casing 2 of the lens meter, effecting through this liquid crystal display mapping indication of the refraction characteristics of the spectacle lenses LL and LR as measured.

(Detachment of the Spectacles 5)

Further, during this measurement, the spectacle frame MF is simply held between the frame retaining plates 36 and 37 by the elastic force of the coil spring 51. Thus, by pulling the frame retaining plate 36 to the front side, the linkage plate 38 is moved to the right in FIG. 8 against the elastic force of the coil spring 51, and the rotation plate 47 is rotated counter clockwise through the linkage plate 38 and the engagement pin 48. As a result of this rotation, the linkage plate 39 is moved to the left in FIG. 8 through the engagement pin 49, and the frame retaining plate 37 moves away from the frame retaining plate 36.

By thus pulling the frame retaining plate 36 to the front side, it is possible to increase the distance between the frame retaining plates 36 and 37. Thus, after measurement, the spectacles 5 can be easily detached from between the frame retaining plates 36 and 37 by pulling the frame retaining plate 36 to the front side to widen the distance between the frame retaining plates 36 and 37.

Further, as a result of this detachment, the nose pad support member 57 is restored to the initial position by the elastic force of the coil spring S, and the microswitch 64 is turned off, the resultant OFF signal being input to the computation control circuit 80. As a result, the computation control circuit 80 operationally controls the drive motor 54 with a predetermined number of driving pulses to rotate the pinion 55, by means of which the gear 52 is rotated counterclockwise in FIG. 8. As a result of this rotation, the engagement protrusion 53 protruding from the side surface of the gear 52 abuts the engagement pin 50 of the rotation plate 47, and then rotates the engagement pin 50 counterclockwise in FIG. 8 to rotate the rotation plate 47 counterclockwise.

As a result of this rotation of the rotation plate 47, the engagement pins 48 and 49 are rotated counterclockwise integrally with the rotation plate 47 from the positions indicated by the two-dotted chain lines, and the linkage plates 38 and 39 are displaced in opposite directions against the tension of the coil spring 51. That is, in FIG. 8, the linkage plate 38 is displaced from the position (not shown) to the right to the position indicated by the solid line, and the linkage plate 39 is displaced from the position (not shown) to the left to the position indicated by the solid line. When the linkage plate 38 has been displaced to the position indicated by the solid line in FIG. 8, the limit switch 56 is turned on by an end portion of the linkage plate 38, and the resultant ON signal is input to the computation control circuit 80. Upon the input of the ON signal from the limit switch 80, the computation control circuit 80 stops the operation of the drive motor 54.

Through this relative displacement of the linkage plates 38 and 39, the frame retaining plates 36 and 37 are displaced from the positions indicated by the two-dotted chain lines in FIGS. 8 and 15(B) to the positions indicated by the solid lines in the directions of the arrows 82 and 83, and the interval between the frame retaining plates 36 and 37 becomes maximum, bringing the system into a measurement standby mode.

(Others)

While in the above-described embodiment pulse motors are used as the drive motors 54 and 74, this should not be construed restrictively. For example, it is also possible to adopt DC motors as the drive motors 54 and 74.

Further, while in the above embodiment synchronism is attained in the moving toward and away from each other of the frame retaining plates 36 and 37 by operationally connecting the frame retaining plates 36 and 37 through the linkage plates 38 and 39, the engagement pins 48 and 49, and the rotation plate 47, this should not be construed restrictively. For example, it is also possible to adopt a construction in which the frame retaining plates 36 and 37 can move toward and away from each other by using an air cylinder and an air circuit. Thus, it is possible to adopt other constructions as long as it is possible to attain synchronism in the moving toward and away from each other of the frame retaining plates 36 and 37.

In the refraction characteristic measurement method of the above-described embodiment of this invention, the left and right lenses LL and LR of the pair of spectacles 5 are held in point contact with the lens rests (lens rest shafts 17a and 28a) at some midpoints in the optical paths of a pair of left and right measurement optical systems 9L and 9R, and the spectacle frame MF of the spectacle lenses LL and LR is held on the front and rear sides by a pair of frame retaining members (frame retaining plates 36 and 37). Then, in this state, the spectacle lenses LL and LR are pressed against and supported by the lens rests (lens rest shafts 17a and 28a) by means of the lens presser members (lens presser shafts 68L and 68R), whereby the way the spectacle frame MF is retained by the frame retaining members (frame retaining plates 36 and 37) is corrected. After the correction, the lens presser members (lens presser shafts 68L and 68R) are retracted from the measurement optical paths of the measurement optical systems 9L and 9R, and the measurement beams around the lens rests (lens rest shafts 17a and 28a) transmitted through the spectacle lenses LL and LR are received by the light receiving element (CCD 24) of the measurement optical systems 9L and 9R, whereby the optical characteristics of the spectacle lenses LL and LR are obtained by the computation control circuit 80 based on the measurement signal from the light receiving element (CCD 24). While in this example one light receiving element (CCD 24) is shared by the measurement optical systems 9L and 9R, it is also possible to provide a light receiving element for each of the measurement optical systems 9L and 9R.

In the refraction characteristic measurement method according to the above embodiment of this invention, the measurement beams around the lens rests (lens rest shafts 17a and 28a) transmitted through the spectacle lenses LL and LR are not obstructed by the lens presser members (lens presser shafts 68L and 68R) and the arms 67L and 67R, so that it is possible to accurately perform refraction characteristic measurement at a number of positions of the spectacle lenses by using a number of measurement beams formed by the pattern plates 17 and 28.

Further, the lens meter of the above embodiment of this invention includes: the pair of left and right lens rests (lens rest shafts 17a and 28a) capable of point supporting the left and right spectacle lenses LL and LR of the pair of spectacles 5; the pair of frame retaining members (frame retaining plates 36 and 37) capable of holding, from the front and rear sides, the spectacle frame MF of the spectacles 5 whose lenses LL and LR are supported by the lens rests (lens rest shafts 17a and 28a); the lens presser members (lens presser shafts 68L and 68R) adapted to advance and retreat with respect to the spectacle lenses LL and LR supported by the lens rests (lens rest shafts 17a and 28a) to press-support the spectacle lenses LL and LR on the lens rests (lens rest shafts 17a and 28a); the pair of left and right measurement optical systems 9L and 9R capable of measuring the refraction characteristics of the spectacle lenses LL and LR placed on the pair of lens rests (lens rest shafts 17a and 28a) by measurement beams around the lens rests (lens rest shafts 17a and 28a); and the computation control circuit 80 which obtains the optical characteristics of the spectacle lenses LL and LR on the basis of measurement signals from the light receiving element (CCD 24) of the measurement optical systems 9L and 9R. Further, the lens pressers (lens presser shafts 68L and 68R) of this lens meter are provided so as to be movable between the pressing positions where the spectacle lenses LL and LR are pressed against the lens rests (lens rest shafts 17a and 28a) and the retracted positions where they are retracted from the pressing positions and the optical paths of the measurement optical systems, and the frame MF of the pair of spectacles 5, whose lenses LL and LR are supported by the lens rests (lens rest shafts 17a and 28a), is supported by the pair of frame supporting members (frame supporting plates 36 and 37), and at the same time, when the lens pressers (lens presser shafts 68L and 68R) are at the retracted positions, the computation control circuit 80 measures the refraction characteristics of the spectacle lenses on the basis of measurement signals from the light receiving element (CCD 24).

In the lens meter of the above-described embodiment of this invention, the measurement beams around the lens rests (lens rest shafts 17a and 28a) transmitted through the spectacle lenses LL and LR are not obstructed by the lens presser members (lens presser shafts 68L and 68R) and the arms 67L and 67R, so that it is possible to accurately perform the measurement of the refraction characteristics at a number of positions of the spectacle lenses by using a number of measurement beams formed by the pattern plates 17 and 28.

Further, in the lens meter of the above-described embodiment of this invention, the opposing surfaces 36a and 37a of the pair of frame retaining members (frame retaining plates 36 and 37) are downwardly inclined and tapered. Due to this configuration, when the spectacle frame MF is held between the opposing surfaces 36a and 37a of the frame retaining members (frame retaining plates 36 and 37), the spectacle frame MF is downwardly pressurized due to the inclination of the opposing surfaces 36a and 37a, and the lenses LL and LR of the spectacle frame MF are pressed against the lens rests (lens rest shafts 17a and 28a). Thus, there is no danger of the spectacle frame MF being detached from between the frame retaining members (frame retaining plates 36 and 37).

Further, the lens meter of the above-described embodiment of this invention is equipped with the following means: a frame detecting means provided between the pair of frame retaining members (frame retaining plates 36 and 37) and adapted to detect the spectacle frame MF the lenses LL and LR of which are placed on the lens rests (lens rest shafts 17a and 28a); a frame retaining mechanism for causing the pair of frame retaining members (frame retaining plates 36 and 37) to move toward and away from each other by a retaining member driving means (drive motor 54); and a presser member driving means (drive motor 74) for moving the lens pressers (lens presser shafts 68L and 68R) between the pressing positions and the retracted positions. Further, the computation control circuit 80 operationally controls the retaining member driving means (drive motor 54) for the frame retaining mechanism on the basis of a frame detection signal from the frame detecting means, whereby the pair of frame retaining members (frame retaining plates 36 and 37) are brought close to each other to hold the spectacle frame MF between the pair of frame retaining members (frame retaining plates 36 and 37). Then, it operationally controls the presser member driving means (drive motor 74) to move the lens pressers (lens presser shafts 68L and 68R) to the pressing positions, whereby the spectacle lenses LL and LR are temporarily held by the lens pressers (lens presser shafts 68L and 68R), and then the lens pressers (lens presser shafts 68L and 68R) are moved from the pressing positions to the retracted positions.

In accordance with the embodiment of the present invention, when the spectacle frame MF is arranged between the pair of frame retaining members (frame retaining plates 36 and 37), the spectacle frame MF is detected by the frame detecting means. Then, the computation control circuit 80 operationally controls the retaining member driving means (drive motor 54) on the basis of a frame detection signal output from the frame detecting means, whereby it is possible to automatically hold (nip) the spectacle frame MF between the pair of frame retaining members (frame retaining plates 36 and 37). Further, the computation control circuit 80 operationally controls the presser member driving means (drive motor 74) to move the lens pressers (lens presser shafts 68L and 68R) to the pressing positions, whereby the spectacle lenses LL and LR are temporarily held by the lens pressers (lens presser shafts 68L and 68R). Thus, even if an attitude of the spectacle frame MF and the spectacle lenses LL and LR held between the frame retaining members (frame retaining plates 36 and 37) is inclined, it is possible to correct this inclination automatically. Further, it is so arranged that, after this correction, the lens pressers (lens presser shafts 68L and 68R) are moved automatically from the pressing positions to the retracted positions, thus facilitating the operation. Further, by performing refraction measurement with the lens pressers (lens presser shafts 68L and 68R) moved from the pressing positions to the retracted positions, the measurement beams around the lens rests (lens rest shafts 17a and 28a) transmitted through the spectacle lenses LL and LR are not obstructed by the lens presser members (lens presser shafts 68L and 68R) and the arms 67L and 67R, so that it is possible to accurately perform measurement of the refraction characteristics of the spectacle lenses at a number of positions by using a number of measurement beams.

Further, in the lens meter of the above embodiment of this invention, the frame detecting means is equipped with the nose pad support member 57 which is arranged between the pair of left and right measurement optical systems and back and forth movable, the biasing means (coil spring S) for forwardly biasing the nose pad support member 57, and the switch (microswitch 64) for detecting rearward movement of the nose pad support member 57. In accordance with this embodiment, it is possible to accurately arrange the left and right spectacle lenses LL and LR of the spectacle frame MF in the measurement optical paths of the left and right measurement optical systems 9L and 9R by means of the nose pad support member 57. Further, it is possible to detect the spectacle frame MF by means of the nose pad support member 57.

While in this example the nose pad support member 57 is back and forth movable, it is also possible to use a vertically movable nose pad support member, performing positioning on the spectacle frame MF and detecting the spectacle frame MF.

According to the first and second aspects of the invention, due to the above-described construction, it is possible to prevent the measurement beams from being intercepted by the lens pressers, thereby making it possible to perform accurate measurement.

Further, according to the third aspect of the invention, the opposing surfaces of the pair of frame retaining members are downwardly inclined and tapered. Due to this configuration, when the spectacle frame is held (nipped) between the opposing surfaces of the frame retaining members, the spectacle frame is downwardly pressurized due to the inclination of the opposing surfaces, and the lenses of the spectacle frame are pressed against the lens rests. Thus, there is no danger of the spectacle frame being detached from between the frame retaining members.

Further, the computation control circuit operationally controls the retaining member driving means on the basis of a frame detection signal output from the frame detecting means, whereby it is possible to hold (nip) the spectacle frame automatically between the pair of frame retaining members. Further, the computation control circuit operationally controls the presser member driving means to move the lens pressers to the pressing positions, whereby the spectacle lenses are temporarily held by the lens pressers. Thus, even if the attitude of the spectacle frame and the spectacle lenses held between the frame retaining members is inclined, this inclination can be automatically corrected. Further, it is so arranged that, after this correction, the lens pressers are automatically moved from the pressing positions to the retracted positions, thus facilitating the operation. Further, by performing refraction measurement with the lens pressers moved from the pressing positions to the retracted positions, the measurement beams around the lens rests transmitted through the spectacle lenses are not intercepted by the lens presser members, so that it is possible to accurately perform measurement of refraction characteristics at a number of positions of the spectacle lenses by using a number of measurement beams.

Further, according to the fifth aspect of the invention, the frame detecting means is equipped with the nose pad support member which is situated between the pair of left and right measurement optical systems and back and forth movable, the biasing means for forwardly biasing the nose pad support member, and the switch for detecting rearward movement of the nose pad support member, so that it is possible to arrange the left and right spectacle lenses of the spectacle frame accurately in the measurement optical paths of the left and right measurement optical systems by means of the nose pad support member. Further, it is possible to detect the spectacle frame by means of the nose pad support member.

What is claimed is:

1. A spectacle lens optical characteristic measuring method comprising: point-supporting left and right spectacle lenses of a pair of spectacles respectively by lens rests at some midpoints of optical paths of a pair of left and right measurement optical systems; retaining a spectacle frame for the spectacle lenses from front and rear sides by a pair of frame retaining members; pressing the spectacle lenses in this state against the lens rests by lens presser members to correct the way the spectacle frame is retained by the frame retaining members; retracting the lens presser members from the optical paths of the measurement optical systems; measuring measurement beams around the lens rests transmitted through the spectacle lenses by the measurement optical systems; and obtaining optical characteristics of the spectacle lenses on the basis of a measurement signal from the measurement optical systems by a computation control circuit.

2. A lens meter comprising: a pair of left and right lens rests capable of point-supporting left and right lenses of a pair of spectacles; a pair of frame retaining members capable of holding a spectacle frame of the pair of spectacles, whose lenses are supported by the lens rests, from front and rear sides; lens presser members for pressing the spectacle lenses supported by the lens rests against the lens rests; a pair of left and right measurement optical systems for measuring optical characteristics of the spectacle lenses supported by the lens rests on the basis of measurement beams passing around the lens rests; and a computation control circuit which controls the measurement optical systems to cause it to execute the measurement and which obtains the optical characteristics of the spectacle lenses on the basis of measurement signals from the measurement optical systems, the lens meter further comprising presser member driving means for moving the lens presser members to pressing positions where they press the spectacle lenses against the lens rests and to retracted positions where they are retracted from the pressing positions, wherein the computation control circuit controls the measurement optical systems upon movement of the lens presser members to the retracted positions by the presser member driving means so as to cause them to execute measurement of the optical characteristics of the spectacle lenses.

3. A lens meter according to claim 2, wherein the pair of frame retaining members have opposing surfaces tapered so as to be inclined downwardly.

4. A lens meter according to claim 2 or 3, further comprising frame detecting means provided between the pair of frame retaining members and adapted to detect the spectacle frame of the spectacle lenses supported by the lens rests and retaining member driving means for driving the pair of frame retaining members so as to move them toward and away from each other, wherein the computation control circuit operationally controls the retaining member driving means upon detection of the spectacle frame by the frame detecting means so as to move the pair of frame retaining members toward each other to cause them to hold the spectacle frame, and operationally controls the presser member driving means so as to move the lens presser members to the pressing positions to press the spectacle lenses against the lens rests, and then move the lens presser members to the retracted positions.

5. A lens meter according to claim 4, wherein the frame detecting means is further equipped with a nose pad support member for supporting nose pads of the pair of spectacles which is arranged between the pair of left and right measurement optical systems and movable in the back and forth direction, biasing means for forwardly biasing the nose pad support member, and a detecting switch which detects backward movement of the nose pad support member against the biasing force of the biasing means.

* * * * *